US006995940B2

(12) United States Patent
Ehrlich

(10) Patent No.: US 6,995,940 B2
(45) Date of Patent: Feb. 7, 2006

(54) SYSTEMS FOR WORF IMPROVEMENT IN CONDITIONAL SERVOWRITING

(75) Inventor: Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 61 days.

(21) Appl. No.: 10/897,319

(22) Filed: Jul. 22, 2004

(65) Prior Publication Data

US 2005/0237659 A1 Oct. 27, 2005

Related U.S. Application Data

(60) Provisional application No. 60/489,025, filed on Jul. 22, 2003.

(51) Int. Cl.
*G11B 21/02* (2006.01)
*G11B 19/04* (2006.01)
*G11B 5/596* (2006.01)

(52) U.S. Cl. ................... 360/75; 360/60; 360/77.08; 360/77.04

(58) Field of Classification Search ............... None
See application file for complete search history.

(56) References Cited

U.S. PATENT DOCUMENTS

| 6,061,200 | A | 5/2000 | Shepherd et al. | ........ | 360/77.04 |
| 6,069,764 | A | 5/2000 | Morris et al. | ............ | 360/77.04 |
| 6,437,936 | B1 | 8/2002 | Chen et al. | ............... | 360/77.04 |
| 6,449,116 | B2 | 9/2002 | Morris et al. | ............ | 360/77.04 |
| 6,563,663 | B1 | 5/2003 | Bi et al. | .................. | 360/77.04 |
| 6,657,805 | B2 * | 12/2003 | Nishida et al. | ............... | 360/60 |
| 6,710,953 | B1 * | 3/2004 | Vallis et al. | .................. | 360/31 |

* cited by examiner

*Primary Examiner*—Andrew L. Sniezek
(74) *Attorney, Agent, or Firm*—Fliesler Meyer, LLP

(57) ABSTRACT

To account for head misplacement while servowriting, conditional writing and/or trimming of servo information can be used. Conditional servowriting allows servowriting to be disabled when it is determined that servo information will not be written and/or trimmed at a desired location or within a threshold distance of a desired location. For example, if a distance between a write element or a predicted location of servo information and a desired location of the servo information or write element exceeds a threshold, writing and/or trimming can be inhibited. Servowriting can be resumed when it is determined that servo information will be written or trimmed at a desired location or within a threshold distance of a desired location. A servowriting step or pass is not re-started when the threshold is exceeded and those wedges for which servo information was not written and/or trimmed can be attempted during subsequent revolutions of the rotatable storage medium. Various methods can also be used to account for servo information that is not written and/or trimmed after a number of revolutions, including increasing threshold(s), writing and/or trimming unconditionally, and re-computing WORF values for a reference disk. Additionally, other techniques including write current variation and individual passes for writing and trimming can be used with various embodiments using conditional writing techniques.

37 Claims, 14 Drawing Sheets

SYSTEMS FOR WORF IMPROVEMENT IN CONDITIONAL SERVOWRITING

CLAIM OF PRIORITY

This application claims priority to U.S. Provisional Application No. 60/489,025 entitled "Systems and Methods for WORF Improvement in Multiple Revolutions in Conditional Servowriting", filed Jul. 22, 2003.

FIELD OF THE INVENTION

The present invention relates to servowriting processes, systems, and devices.

BACKGROUND

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

In existing servowriting techniques, servowriting passes or steps can be stopped and restarted because of a detected displacement while servowriting. Previously written servo information before the displacement during the step or pass may be written again or erased and then written again. While writing a track of servo information, manufacturers may restart writing the track each time the head is out of position. Much time can be spent restarting operations until the head is an acceptable position while writing an entire track.

BRIEF SUMMARY

Systems and methods in accordance with the present invention take advantage of conditional writing and trimming techniques used in servowriting and self-servowriting. Conditional servowriting techniques allow servowriting to be disabled when it is determined that servo information will not be written and/or trimmed at a desired location or within a threshold distance of a desired location. In some embodiments, servowriting can be inhibited when a distance between a predicted location of servo information and a desired location of servo information is greater than a threshold distance. In other embodiments, a position of a head or write element can be used to determine whether to servowrite. Servowriting can be resumed it is determined that servo information will be written or trimmed at a desired location or within a threshold distance of a desired location.

In one embodiment, servowriting can be performed on a wedge by wedge basis during a servowriting pass or step. Servowriting can be disabled or inhibited for servo wedges for which it is determined that servo information will not be written and/or trimmed at a desired location or within a threshold distance of a desired location. Servo information can be written and/or trimmed for those servo wedges for which the servo information will be or is predicted to be in an acceptable location.

In one embodiment, servowriting can be performed without re-writing previously written servo information. During a pass or step, servo information can be written when its location will be acceptable and not written when it is not.

In some embodiments, information indicating servowriting progress can be cached. For example, an indication of servo wedges for which servo information has been written and/or not written can be cached.

In one embodiment, information regarding a reference pattern such as WORF information can be determined during extra revolutions of servowriting. The WORF information can be used to more accurately position the head during subsequent revolutions.

Other features, aspects, and objects of the invention can be obtained from a review of the specification, the figures, and the claims.

DETAILED DESCRIPTION

Figure 1:
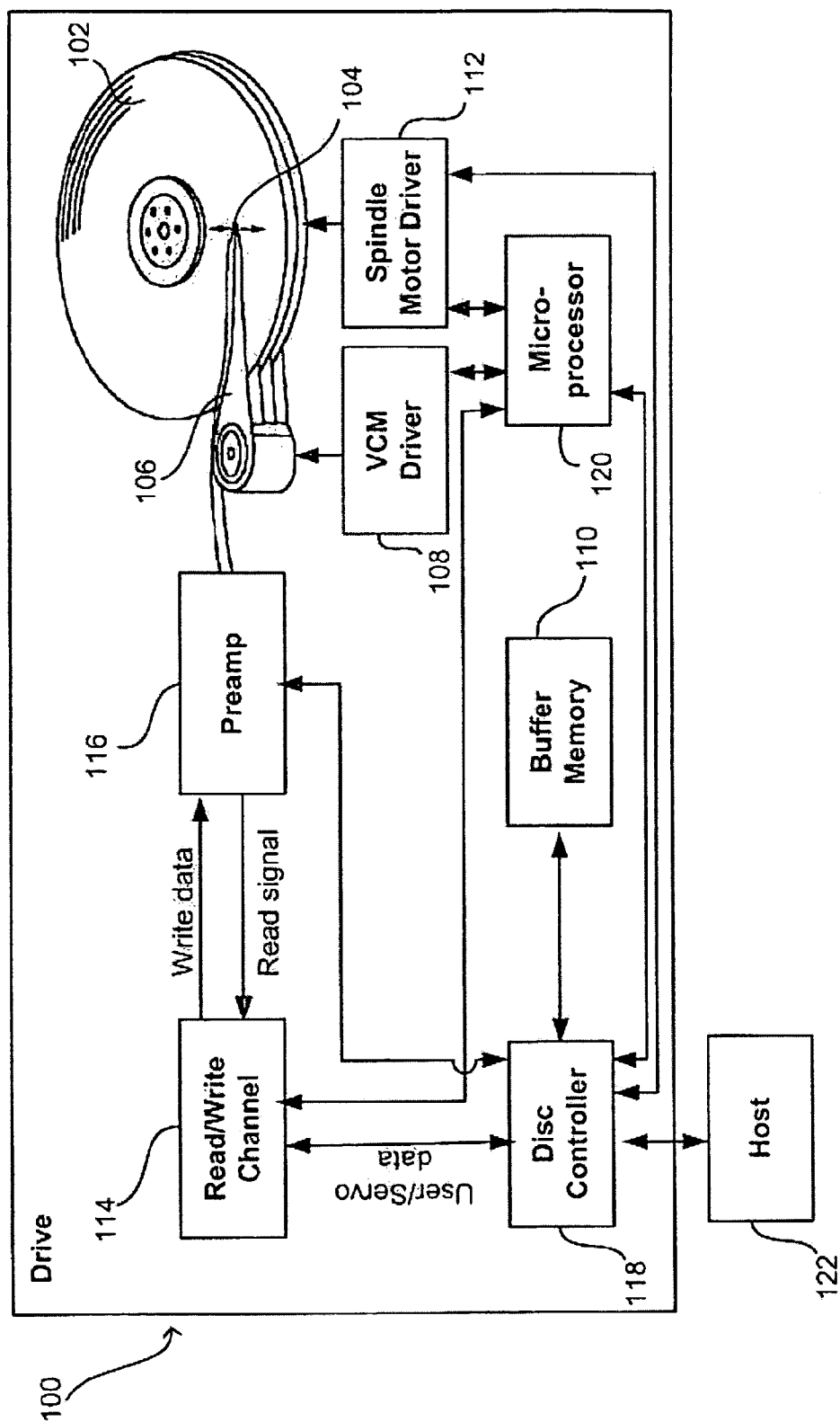
FIG. 1 is a diagram showing components of a disk drive that can be used in accordance with embodiments of the present invention.

Systems and methods in accordance with one embodiment of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer, read channel, and a host 122. A host can be any device, apparatus, or system capable of utilizing the data storage device, such as a personal computer, Web server, or a consumer electronics device. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118.

Figure 2:
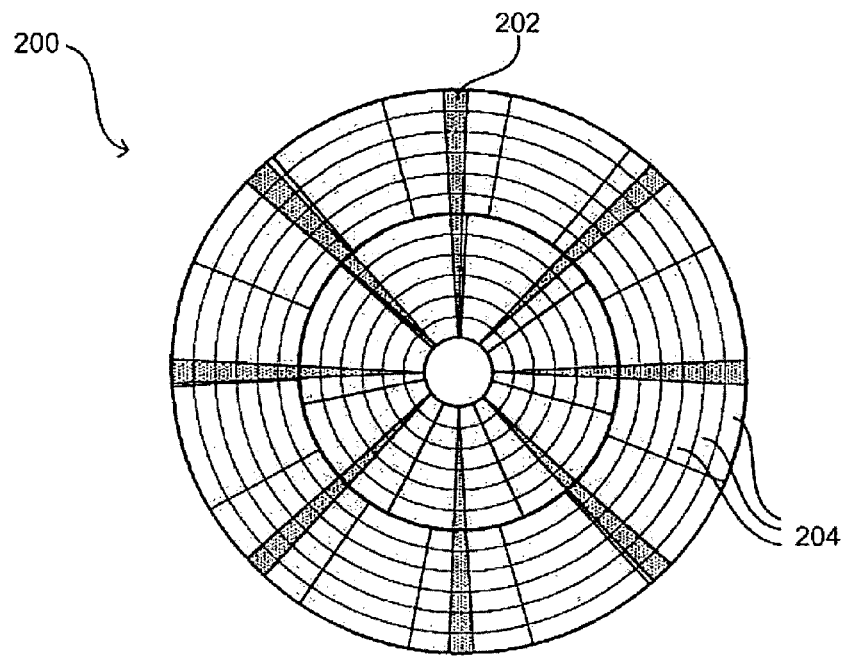
FIG. 2 is a diagram showing an example of a data and servo format for a disk in the drive of FIG. 1.

The information stored on such a disk can be written in concentric tracks, extending from near the inner diameter of the disk to near the outer diameter of the disk 200, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

The servo information often includes bursts of transitions or boundaries called "servo bursts." A boundary or burst boundary as used herein does not mean or imply that servo bursts forming a boundary necessarily have a substantially common edge as the bursts can be spaced such that there is a gap radically or circumferentially between the bursts. The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. The position of a head or element, such as a read/write head or element, relative to a target or desired location such as the center of a track or other desired location, will be referred to herein as position-error. Position-error distance may be used to refer to the distance between a target or desired location and an actual or predicted location of a head or element. The signal generated as a head or element moves across servo bursts or boundaries between servo bursts is often referred to as a position-error signal (PES). The PES can be used to represent a position of the head or element relative to a target location such as a track centerline defined by a boundary between servo bursts.

Figure 3:
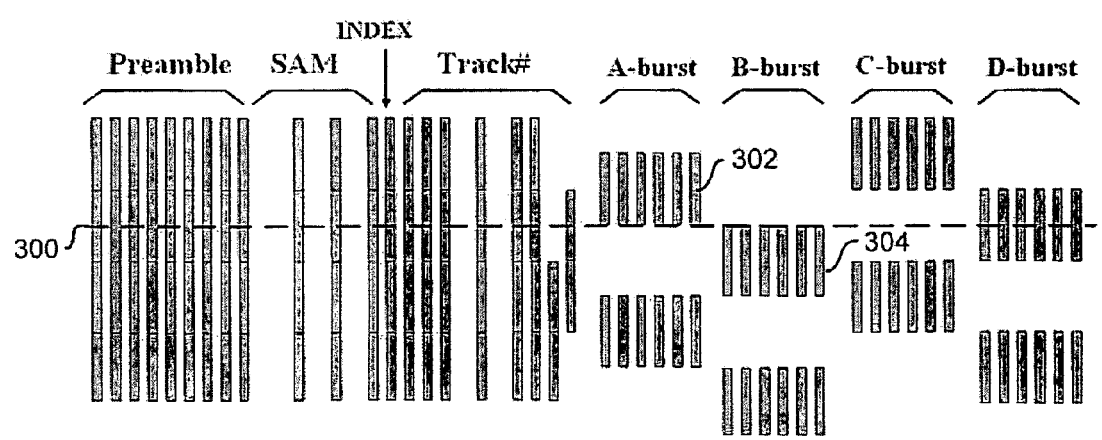
FIG. 3 is a diagram showing servo information that can be written to the tracks shown in FIG. 2.

A centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero and represent a position at track center if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The servo scheme described above is one of many possible schemes for combining the track number read from a servo wedge and the phases or amplitudes of the servo bursts. Many other schemes are possible that can benefit from embodiments in accordance with the present invention.

A problem that exists in the reading and writing of servo patterns involves the misplacement, or offset, of a read/write head with respect to the ideal and/or actual position of a track. It is impossible to perfectly position a head with respect to a track for each rotation of a disk, as there is almost always a noticeable offset between the desired position and the actual position of the head with respect to the disk. This can cause problems when writing servo patterns, as each portion of the pattern can be slightly misplaced. This can lead to what is referred to as written-in runout. Written-in runout can be thought of as the offset between the "actual" centerline, or desired radial center, of a track and the centerline that would be determined by a head reading the written servo pattern. Written-in runout can lead to servo performance problems, wasted space on a disk and, in a worst case, unrecoverable or irreparably damaged data.

Systems and methods in accordance with one embodiment of the present invention overcome deficiencies in prior art servowriting and self-servowriting systems by taking advantage of conditional methods for performing servowriting operations. For example, the non-repeatable runout (NRRO) suffered by a read/write (R/W) head during self-servowriting operations can be written into the servo bursts. The written-in runout of a self-servowritten pattern can be reduced by writing and/or trimming servo information, including servo bursts, conditionally upon a location of the head or write-element during servowriting. As used herein and as understood by those of ordinary skill in the art, servowriting can include writing servo information, trimming servo information, or writing and trimming servo information. In a given servowriting pass, servo information can be written, trimmed, or written and trimmed. Reference to writing servo information herein can include writing, trimming, or writing and trimming as writing and trimming are similar operations that can be performed by or according to the systems and methods of the present invention.

It will be understood that various self-servowriting techniques can benefit from embodiments in accordance with the present invention. One such self-servowriting technique is often referred to as "replication" self-servowriting. In replication self-servowriting, a media-writer can be used to write servo information on a stack of disks. Each disk can then be placed in a separate drive having multiple blank disks, such that the drive can use the patterned disk as a reference to re-write servo patterns on all of the other disk surfaces in the drive, as well as writing a servo pattern on the media-written surface, if desired. Various other techniques exist for producing a reference for replication self-servowriting. For example, the reference surface can be magnetically printed, as described in U.S. Pat. No. 6,567,227. Regardless of the method used for producing the reference pattern, it is possible for replication self-servowriting systems to benefit from use of the current invention.

Another class of self-servowriting techniques is known as "propagation" self-servowriting. Techniques in this class differ from those in the replication class in the fact that the wedges used by the drive at one point in the process are later used as reference wedges for other tracks. These schemes are thus "self-propagating." Typically, such techniques require a R/W head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk. In this type of self-servowriting operation, previously written tracks can later serve as reference tracks. In other applications, the guide pattern may be produced by the drive, without the use of a servowriter. Regardless of the method used for producing the guide pattern, it is possible for propagation self-servowriting systems to benefit from use of the current invention.

As shown in FIG. 3, the radial position of a track centerline 300 can be defined by the "lower" edge of one burst 302 and the "upper" edge of a corresponding burst 304 in a differential pair. Here, the "lower" edge can refer to the edge of the burst nearest the inner diameter (ID) of a disk, while the "upper" edge can refer to the edge nearest the outer diameter (OD) of the disk. The position of a center of a track can be determined by examining the boundary between these edges. Embodiments in accordance with the present invention can allow the track defined by such burst edges to have reduced written-in runout using conditional servo information writing and trimming methods. FIG. 3 illustrates exemplary servo information. Other servo patterns, including for example, additional bits to denote track number are considered within the scope of the present invention.

At each track to be servowritten, it can be desirable to remove the synchronous runout of the reference pattern as much as possible. Several techniques exist for removing synchronous runout that are known to those skilled in the art. After substantially removing the synchronous runout, each head should be following substantially circular tracks on the respective disks. The remaining runout of each head should then be dominated by non-synchronous runout suffered by the reference head, or the head observing the reference surface, from which the position of the head-stack is controlled. The head stack assembly (HSA) typically refers to the combination of the actuator, voice coil motor (VCM), E-block (arms of the actuator), suspensions, and heads. The HSA is typically one of two major moving parts of a drive, with the other moving part being the spindle and disks, referred to as the "disk-stack." There may be other contributors to the remaining runout for the R/W heads that is not common to that suffered by the reference head. Typically, these contributors will be relatively small.

Figure 4:
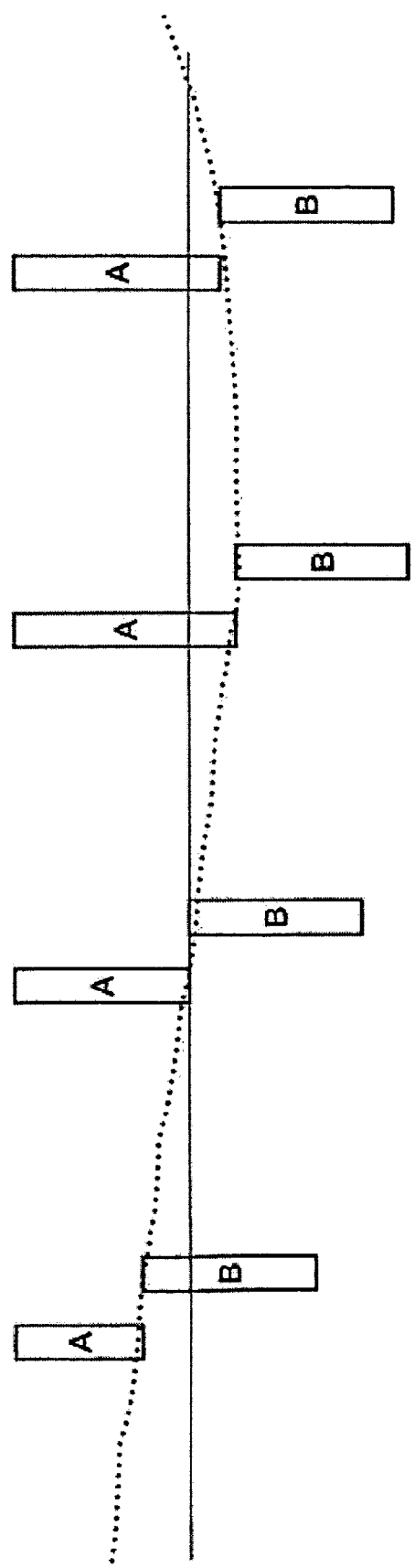
FIG. 4 is a diagram showing displacement of servo bursts that can be written to the tracks shown in FIG. 2.

FIG. 4 shows an example of a pattern wherein the remaining runout is dominated by non-synchronous runout suffered by the reference head. For the sake of simplicity, erase bands will be ignored as they do not significantly impact the discussion of various embodiments. In FIG. 4, during the servowriting step in which the A-bursts were written, the writer was approximately on track, such that the upper edges of the A-bursts are in approximately the correct location. The dotted line shows the path of the upper edge of the write element of the head during the next servowriting step, in which the A-bursts are trimmed and the B-bursts are written. Notice that the misplacement of the head during the second servowriting step results in position errors for the lower edges of the majority of the A-bursts and the upper edges of the majority of the B-bursts. This can cause a subsequent read or write operation on the track defined by these bursts to misread data, as the head will be offtrack, or misplaced, during much of the read or write operation.

While the final servo wedges (reference 202 in FIG. 2) are being written for each head, the position measurements from the reference head, or a servo position signal, can indicate approximately how much each head is misplaced with respect to track center. For example, looking at FIG. 1, a signal from the head 104 reading the reference pattern can be passed as servo data through the read/write channel 114 to the disk controller 118, and passed on to the microprocessor 120, which can send commands to the VCM driver 108, in order to attempt to move the head back into position relative to the track. The measured PES can also be analyzed and used to determine whether the write element should write and/or trim servo information. The position measurements from the reference pattern will probably be non-zero, primarily due to imperfect control of the servo position of the reference head, and can be used to determine whether servo information should be written and/or trimmed. The PES can be used to determine or predict if a location of to-be-written servo information will be within specified limits. If the location is not within specified limits, writing of servo information can be disabled. The PES can also be used to determine if a location of the write element (actual or predicted) is within specified limits for performing trim operations on any previously written servo information. Any number of parameters can be used to determine if a servowriting operation should proceed, including a position of the write element, a predicted position of the write element, or a predicted position of to-be-written and/or trimmed servo information.

Figure 5:
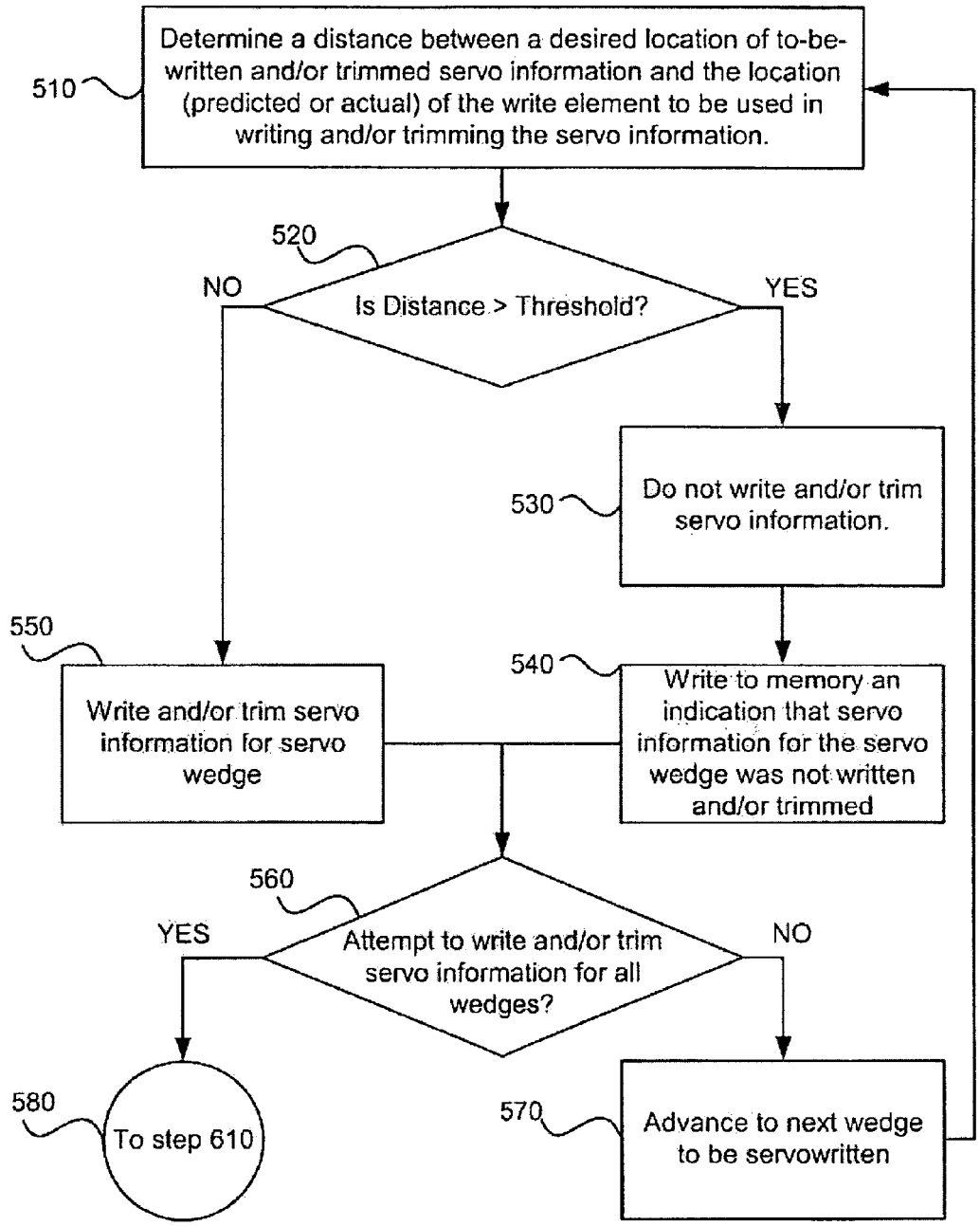
FIG. 5 is a flowchart illustrating a method in accordance with one embodiment of the present invention for writing and/or trimming servo information during a revolution of a rotatable storage medium during a servowriting pass.

An exemplary method that can be used to account for the actual path of a write element during a revolution of a disk during a servowriting pass is shown in the diagram of FIG. 5. A servowriting step can include one or multiple servowriting passes and each track of a disk can be defined by one or multiple servowriting steps. For example, in some embodiments a servowriting step can include one pass for writing and trimming servo information. In other embodiments, a servowriting step can include a first pass for writing servo information and a second pass for trimming servo information. As will be described below in accordance with some embodiments, the servo information to be written and/or trimmed during a pass of a servowriting step may be written and/or trimmed in one or multiple revolutions of the disk. A pass need not include an integer number of revolutions of the disk. Passes or steps can be completed at any point during a revolution of the disk and passes or steps can begin at any point during a revolution of the disk.

Using servo position information, it is possible to determine the position of the head with respect to a track centerline or other reference position. Using an interpolation algorithm or state-space control methods, it is also possible to determine a predicted position of the head when servo information is actually written or trimmed or a predicted location of to-be-written or to-be-trimmed servo information, as there will likely be some radial variation between the time that the reference pattern is read and the time that the servo information is written and/or trimmed. When writing servo information, the actual writing of the final servo information onto a disk does not occur simultaneously with the reading of the reference data, as it is necessary to read the information before the final servo information can be written. As such, there will be a delay in time between the reading and writing of the information. Because of this delay in time, the radial position of the head at the time of writing will not be exactly where it was when reading the servo information or when another head was reading the servo information. It may then be necessary, depending on the length of the delay and/or the variation of the head path, to make at least one calculation to predict where the head will be when the data is written. For example, a state-estimator can be used to predict the position-error of the reference head at the time of writing from the estimated state variables at the time of the most recent sample, such as by using standard state-space techniques. Such techniques can take into account, for example, the radial velocity and direction of the R/W head and the rotation speed of the disk.

For convenience, the remainder of this example will be discussed in terms of the location or position of the head, although it will be understood that other parameters such as a predicted location-of to-be-written and/or trimmed servo information can be used. It will also be understood that any portion of the head, including a write element coupled with the head, can be used as a reference for determining distances. A PES may be used to determine, estimate, or predict a distance. It will be understood that the systems and techniques described herein can apply to both writing and trimming servo information and that reference to one or the other does not imply that the other can not be performed by or according to the system or technique.

Once the position of the head is known, it is possible to determine the distance between a desired location of to-be-written servo information or to-be-trimmed servo information (or a desired write or trim location) for a first servo wedge and a portion of the head 510. The distance can be calculated in a number of ways, such as from the edge of the to-be written or to-be-trimmed information to the center of the write element or to the appropriate edge of the write element. First is not intended to imply any order for selecting a servo wedge as the first servo wedge can be any randomly or otherwise chosen servo wedge on which to begin the pass or revolution. For example, in one embodiment the servo wedge on which to begin the pass is chosen so as to optimize efficiency by beginning on a first wedge after servo positioning is sufficiently settled and repeatable runout removal is complete after a seek operation to the track to be servowritten.

The distance determined in step 510 can be used to determine whether servo information for the servo wedge should be written and/or trimmed 520. The distance can be compared with a threshold to determine whether or not to trim and/or write the servo information. Various types of thresholds can be used. In one embodiment, a threshold can be a distance from a desired location. If a position of a write element is beyond a position defined by this threshold distance or if a distance between a desired location and an actual or predicted location of write element is greater than this threshold distance, writing and/or trimming of servo information can be disabled. In other embodiments, a threshold can be a value of a position error signal. If the value of the PES reaches or exceeds the threshold PES value, writing and/or trimming of servo information can be disabled.

If the distance determined in step 510 is greater than the threshold distance, the servo information for the wedge is not written and/or trimmed 530. The threshold can also be defined such that servo information is not written and/or trimmed if the distance is equal to the threshold. In step 540, an indication is written to memory that the servo information for the servo wedge was not written and/or trimmed. The indication can be written to any available memory including a buffer memory such as SRAM or DRAM as shown in FIG. 1. If it is determined that the distance from step 510 is not greater than a threshold, the servo information for the wedge can be written and/or trimmed 550.

In step 560, it is determined whether an attempt has been made to write and/or trim servo information for all servo wedges during the revolution of the servowriting pass. If writing and/or trimming of servo information for all servo wedges has not been attempted, servowriting advances to a next wedge 570 and the method continues. If writing and/or trimming of servo information for all servo wedges of the revolution has been attempted, the revolution of the servowriting pass is complete. After a revolution is complete, servowriting can proceed according to a method illustrated in FIG. 6, 7, 8, or 16, as will be discussed herein.

The method illustrated in FIG. 5 allows the writing and/or trimming of servo information for a servo wedge in a pass of a servowriting step to be skipped or disabled when it is determined that a head or element is not in an acceptable position for writing and/or trimming servo information. By noting which servo wedges have been written and/or trimmed and which have not, a servo wedge for which the write element was not in an acceptable position to write and/or trim can be skipped and the write and/or trim attempted on a subsequent revolution. Additionally, those servo wedges for which the write and/or trim was performed do not need to be repeated. Although FIG. 5 illustrates writing to memory an indication that servo information was not written and/or trimmed for a particular wedge, it will be understood by those skilled in the art that an indication that servo information for a particular servo wedge was written and/or trimmed can be written in addition to or in place of an indication that servo information was not written and/or trimmed for a particular wedge.

In some embodiments in accordance with the present invention, position-error information determined at a first circumferential location can be used to determine whether to write and/or trim servo information at a second circumferential location. For example, a distance between a desired location of to-be-written servo information or to-be-trimmed servo information for a first servo wedge and a portion of a write element can be determined. If the distance is greater than a threshold, writing and/or trimming of servo information for a second servo wedge can be disabled. In some embodiments, the second servo wedge can be a next consecutive servo wedge following a servo wedge for which the distance is determined. In other embodiments, the second servo wedge can be a servo wedge a number of servo wedges, for example, 3, following the servo wedge for which the distance is determined. Such embodiments can be useful in applications where a time delay, and thus a position delay of a write element, exists between determining position information and disabling writing and/or trimming. It will be understood by those of ordinary skill in the art that due to time delays in some embodiments, wedges on a target track or disk may be written and/or trimmed during a time between reading servo wedges on a reference track or disk.

Position-error information determined at a first circumferential location can also be used to determine whether to write and/or trim servo information at multiple circumferential locations. For example, a distance between a desired location of to-be-written servo information or to-be-trimmed servo information for a first servo wedge and a portion of a write element can be determined. If the distance is greater than a threshold, writing and/or trimming of servo information for a number of servo wedges can be disabled. For example, using position information determined at a first servo wedge, writing and/or trimming of servo information for the next 4 consecutive servo wedges encountered in the servowriting pass can be disabled. It is also possible to inhibit writing if the distance is greater than a first threshold and restart writing when the distance is less than a second threshold. The first and second threshold can be the same or different. A second threshold that is less than the first threshold may help avoid excessive cycling between enabling and inhibiting of writing.

Figure 6:
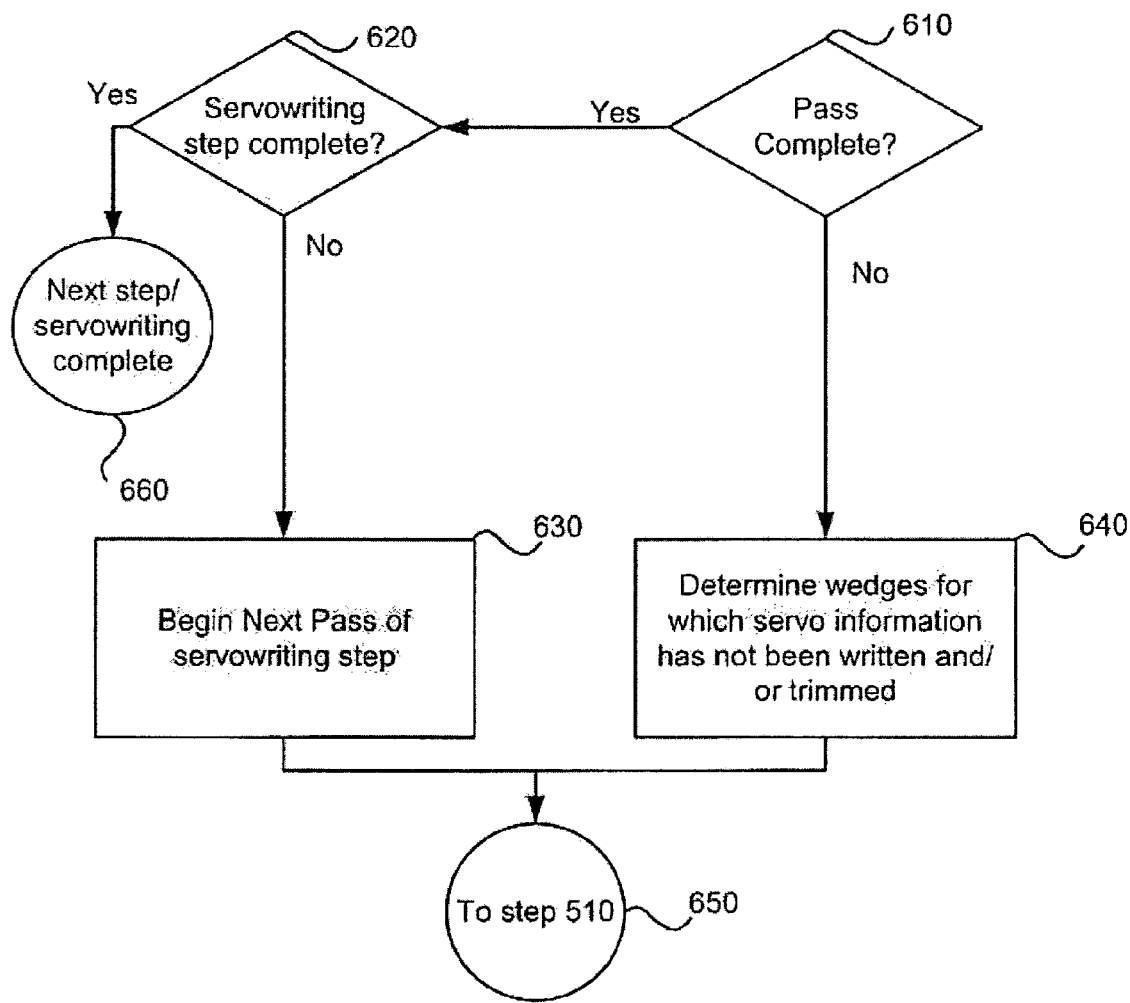
FIG. 6 is a flowchart illustrating a method in accordance with one embodiment of the present invention for performing a servowriting pass.
Figure 7:
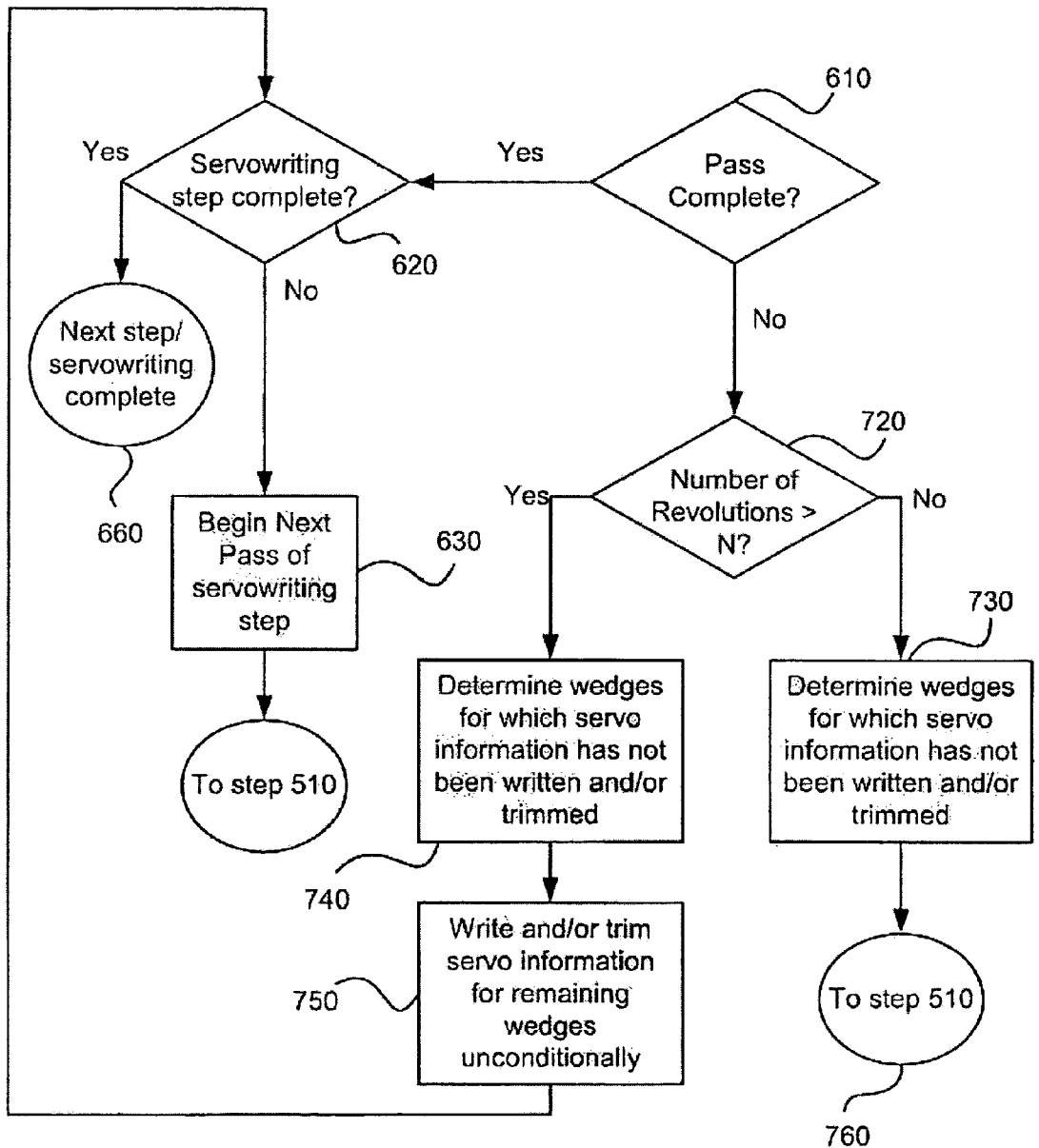
FIG. 7 is a flowchart illustrating a method in accordance with one embodiment of the present invention for performing a servowriting pass, wherein servo information is written and/or trimmed unconditionally on a last revolution of the pass.

FIG. 6 illustrates a method that can be used to account for the actual path of a write element when performing a servowriting pass. The method can begin after a first revolution of a servowriting pass as shown in FIG. 5. In step 610 it is determined whether all servo information to be trimmed and/or written during the servowriting pass has been written and/or trimmed. If all servo information to-be-written and/or trimmed for each servo wedge during the servowriting pass has been written and/or trimmed, it is determined whether additional passes for the current servowriting step need to be performed 620. If all passes for the servowriting step have been performed, the servowriting step is complete and a next step can begin or servowriting can be complete if all steps have been completed 660. If additional passes for the servowriting step are to be performed, the next pass of the servowriting step is begun 630 and attempted according to the method illustrated in FIG. 5.

If all servo information to-be-written and/or trimmed for each servo wedge during the servowriting pass has not been written and/or trimmed, then the wedges for which servo information to be written and/or trimmed during the pass has not been written and/or trimmed are determined 640. After the wedges are determined, the servo information for those wedges can be attempted to be written and/or trimmed during a subsequent revolution according to the method of FIG. 5 (step 650).

To the extent the method illustrated in FIGS. 5 and 6 requires additional revolutions to write servo information, additional time for servowriting can be required. Accordingly, measures can be used to limit the number of revolutions. In the method illustrated in FIG. 7, servo information is written and/or trimmed unconditionally on a last revolution after a predetermined number of revolutions of a servowriting pass. That is, after it is determined that not all servo information to be written and/or trimmed during the pass has been written and/or trimmed 610, the number of revolutions can be compared to a predetermined number of revolutions N (step 720). If the number of revolutions is not greater than N, the wedges for which servo information to-be-written and/or trimmed during the pass has not been written and/or trimmed are determined 730. After the wedges are determined, the servo information for those wedges can be attempted to be written and/or trimmed during a subsequent revolution according to the method of FIG. 5 (step 760).

If the number of revolutions is greater than N, the wedges for which servo information to-be-written and/or trimmed during the servowriting pass has not been written and/or trimmed can be determined 740. The servo information to-be-written and/or trimmed during the pass for those wedges can be written and/or trimmed unconditionally during a next revolution 750. That is, writing and/or trimming will not be disabled because the write element is out of position.

Figure 8:
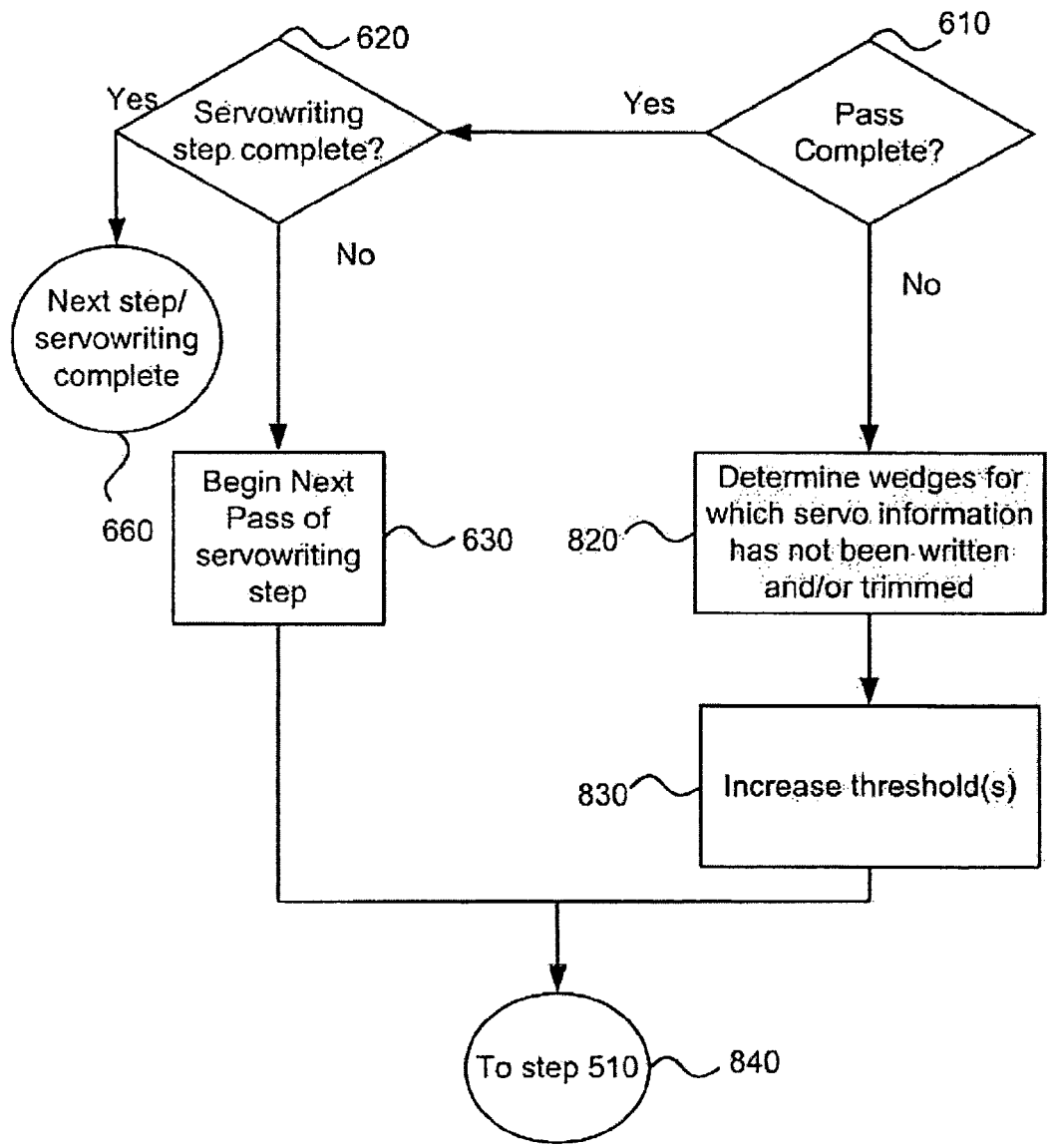
FIG. 8 is a flowchart illustrating a method in accordance with one embodiment of the present invention for performing a servowriting pass, wherein a threshold(s) is increased after some revolutions.

FIG. 8 illustrates another exemplary method that can be used to account for the actual path of a write element when performing a servowriting pass. In one embodiment, the method can begin after a first revolution of a servowriting pass has been completed according to the method illustrated in FIG. 5. It is first determined whether all servo information to-be-written and/or trimmed during the servowriting pass has been written and/or trimmed 610. If all servo information has been written and/or trimmed, the method proceeds as previously discussed with regards to FIG. 6. If not all servo information has been written and/or trimmed, the wedges for which servo information to-be-written and/or trimmed during the pass has not been written and/or trimmed can be determined 820. The threshold(s) used to determine whether servo information for a wedge should be written and/or trimmed can then be increased 830. After increasing the threshold(s), the servo information for the remaining wedges can be attempted to be written and/or trimmed on a subsequent revolution according to the method of FIG. 5 (step 840).

It will be appreciated by those skilled in the art that various schemes for increasing the threshold(s) can be used. In one embodiment, one threshold is used for each wedge to be written and/or trimmed during the servowriting pass. This threshold can then be increased by a predetermined amount. In other embodiments, different thresholds are used for writing servo information for individual wedges. In step 830, the threshold used for each of these wedges can be increased by a predetermined amount that can be different for each threshold or the same for each threshold.

Additionally, in some embodiments, the position error of the write element observed during a previous revolution can be used to determine an appropriate amount by which to increase the threshold(s). An averaged position error magnitude of the write element while trying to write and/or trim during a previous revolution can be used to increase a single threshold or multiple thresholds. Many other values such as the RMS of the position error signal for example, can also be used to determine an amount by which to increase the threshold. In other embodiments, an individual position error of the write element observed while attempting to write and/or trim servo information for an individual wedge can be used to increase the threshold for that individual wedge by an appropriate amount.

It will further be appreciated that the threshold(s) need not be increased after every revolution or even after the first revolution. For instance, a maximum number of revolutions could be established, such as 3, for example. If all servo information to be written and/or trimmed during a servowriting pass was not written during the first three revolutions, the threshold(s) could be increased. If all servo information was not written and/or trimmed during the next 2 revolutions, the threshold(s) could be increased again, etc.

In one embodiment in accordance with the present invention, a characteristic of a track can be used to determine conditional servowriting parameters. For example, the number of revolutions allocated before increasing a threshold or writing unconditionally is based upon the specific track(s) or burst boundaries that are affected by the servo information to-be-written or trimmed during the given pass. Such an embodiment can be a useful balance for certain applications where an improvement in head or element position control during write or trim operations is desired, but the amount of extra time needed to take additional revolutions for all servowriting passes or steps is determined to be unacceptable or undesirable.

For example, a series of burst boundaries such as A-burst/B-burst boundaries can be spaced circumferentially around a disk to define a track centerline, which can be used during write operations. Other burst boundaries spaced circumferentially around a disk can be used for purposes such as reading and/or positioning, but not for defining track centerlines. In one embodiment in accordance with the present invention, extra revolutions are allocated for trimming and/or writing servo information such as bursts whose edges define track centerlines before increasing a threshold. For example, 5 revolutions could be allocated to writing servo information that includes burst(s) that will form boundaries with other bursts to define track centerlines before increasing a threshold. For all other servo information that does not include bursts that will form boundaries with other bursts to define track centerlines, 3 revolutions could be allocated before increasing a threshold. The number of revolutions can vary by embodiment and can be adjusted depending on the requirements for a particular application.

Extra revolutions can also be allocated to writing and/or trimming servo information that influences the positioning of the head or element near system tracks or other important tracks. These tracks can include tracks set aside for storing system information such as defective sector information, WORF information, data zone information, or other information needed to perform various drive functions. In various applications, various tracks may be considered more critical such that more accurate positioning of the head near those tracks is desired. Extra revolutions for writing the servo information for those tracks can also be allocated.

The methods illustrated in FIGS. 5 and 6 can also be used to account for the actual path of a write element when performing multiple passes of a servowriting step in embodiments where individual passes are used for writing and trimming. For example, the position-error of a write element while performing a trim of an A-burst of a servo wedge can be used to establish an appropriate threshold to be used while attempting to write a corresponding B-burst.

Figure 9:
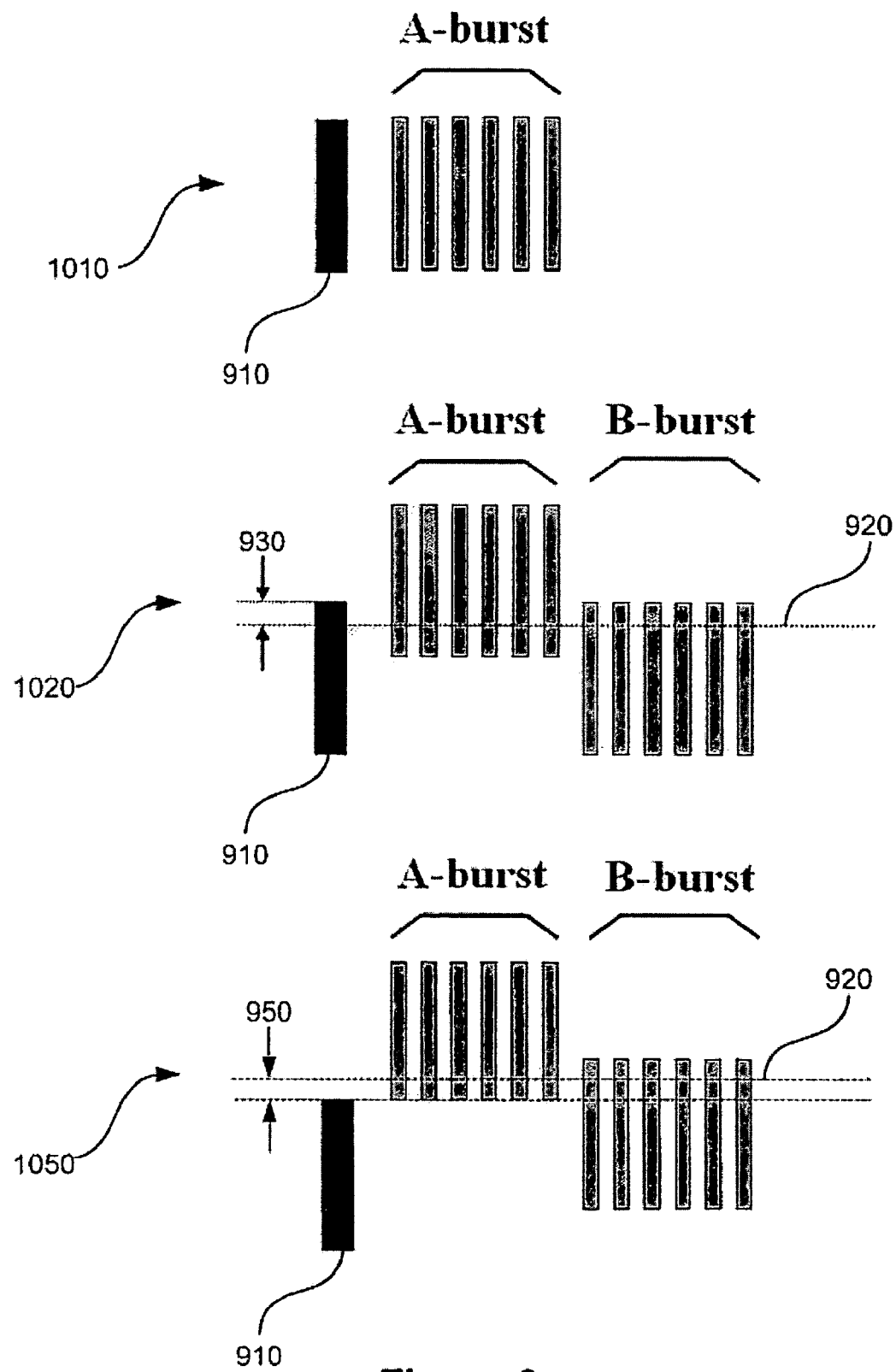
FIG. 9 is a diagram of an exemplary servo-burst pattern being written over a progression of servowriting steps in accordance with one embodiment of the present invention.
Figure 10:
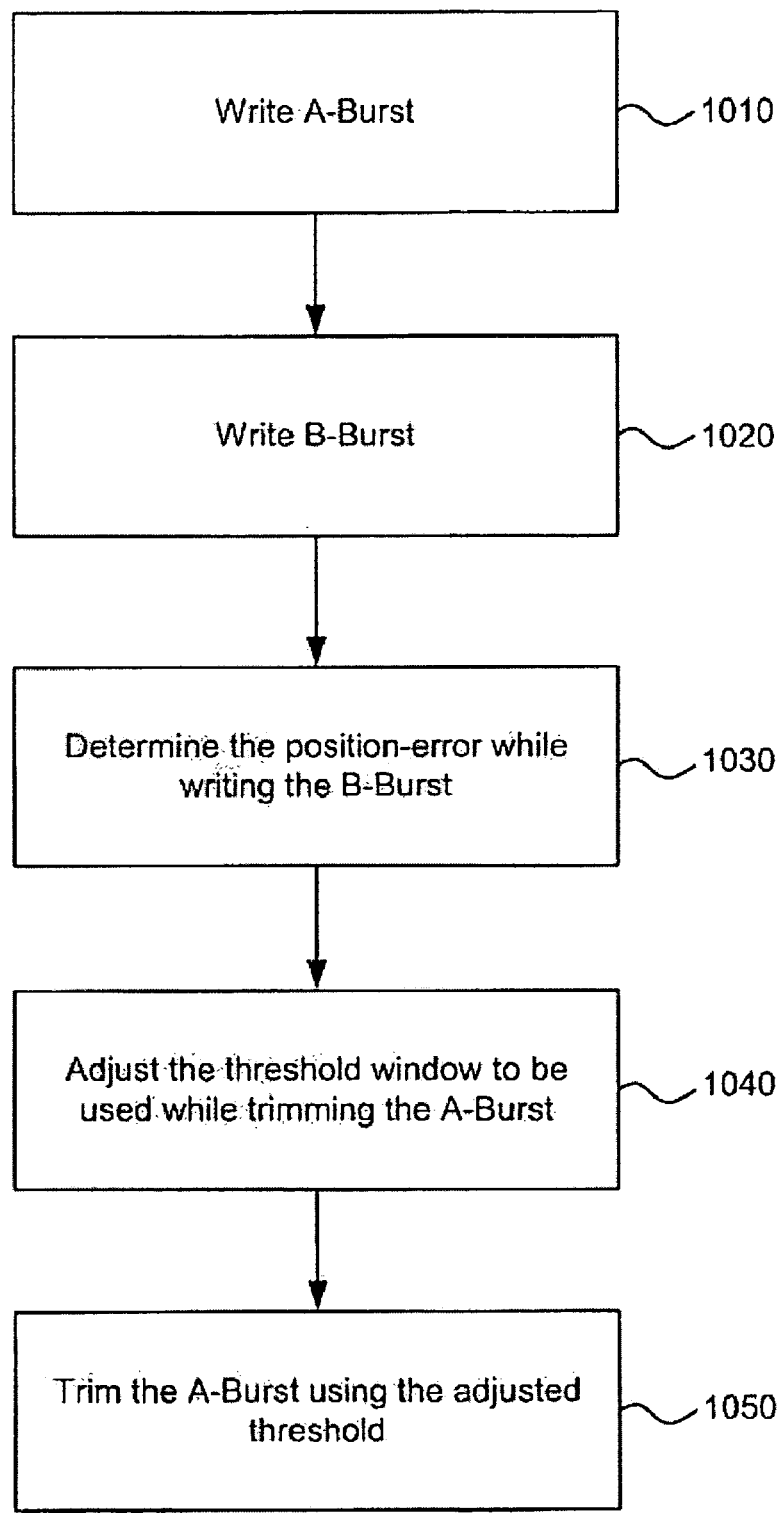
FIG. 10 is a flowchart illustrating a method that can be used to write the servo-burst pattern of FIG. 9 in accordance with one embodiment of the present invention.

Consider the diagram of an exemplary servo-burst pattern being written over a progression of servowriting steps illustrated in FIG. 9, and the flowchart illustrating the method performed in writing and trimming the bursts shown in FIG. 10. For the sake of simplicity, the following example only discusses writing and trimming servo information for a single wedge and single burst pair, although it will be understood that multiple wedges and multiple servo bursts around the circumference of the disk can be written and/or trimmed during each of the servowriting passes and steps discussed herein. In a first servowriting step 1010, write element 910 writes an A-burst. The A-burst can be written as part of a servowriting pass performed in accordance with the methods illustrated in FIGS. 5 and 6, although it need not be. In a second servowriting step 1020, the write element writes a B-burst. The B-burst can also be written as part of a servowriting pass performed in accordance with the methods illustrated in FIGS. 5 and 6 although other techniques can be used. Several revolutions or fractions thereof may have been completed before the write element was in position to write the A-Burst and B-burst.

As shown in FIG. 9, when writing the B-burst, the upper edge of the write element was displaced a distance 930 (towards the top of the page as shown in the figure, or towards the OD of the disk) from the nominal desired location 920 of the boundary between the B-burst and the A-burst. Due to the displacement of the write element, the value of the PES while writing the B-burst can be non-zero. The value of the PES when writing the B-burst can be determined in step 1030. In step 1040, the threshold or threshold window used for trimming the A-burst can be adjusted.

To help compensate for the error in writing the B-burst, the acceptable value of the PES or acceptable PES window while trimming the A-burst can be adjusted. For example, assume that an acceptable PES range or window of +10 to −10 units was being used. That is, a first threshold of +10 units was being used for position-errors in a first direction (e.g., towards the outer diameter of the disk) and a second threshold of −10 units was being used for position-errors in a second direction (e.g., towards the inner diameter of the disk). Assume further that the PES while writing the B-burst was +3 units, indicating a displacement towards the outer diameter of the disk. In order to help compensate for the displacement while writing the B-burst, the acceptable PES range can be adjusted to +7 to −13 units, thus allowing less position-error in the direction of the first displacement and more position-error in the opposite direction of the first displacement. This can re-center the range of acceptable position-error to increase the probability that the position-error while trimming the A-burst will offset the position-error while the B-burst was written.

After adjusting the acceptable PES range, the A-burst can be trimmed in step 1050 according to the methods illustrated in FIGS. 5 and 6. As shown in FIG. 9, the write element is displaced a distance 950 while trimming the A-burst. In this example, the averaged displacement of the write element while writing the B-burst and trimming the A-burst can result in a burst boundary approximately at the nominal desired location of the burst boundary.

Although the B-burst was written prior to trimming the A-burst in the foregoing example, it will be understood by those of ordinary skill in the art that the principles will apply equally as well to embodiments where the position-error is determined while trimming a first burst and then used to adjust the threshold or threshold window used while subsequently writing a corresponding burst. It will further be understood that other types of thresholds and threshold windows may be used in other embodiments. For example, if a threshold distance is used, the threshold distance or window of acceptable distances (displacements) for a write or trim can be adjusted based upon a previously observed position-error while performing a corresponding operation.

The use of thresholds to control the writing of servo information for servo wedges can be extended through the use of multiple thresholds for different directions of position-error. Different thresholds can be used to inhibit writing or trimming depending on the direction of displacement, relative to a desired location, of the predicted position of to-be-written servo information, the predicted position of to-be-trimmed servo information, or the predicted or actual position of a write element to be used in writing or trimming the to-be-written or to-be-trimmed servo information.

Figure 11:
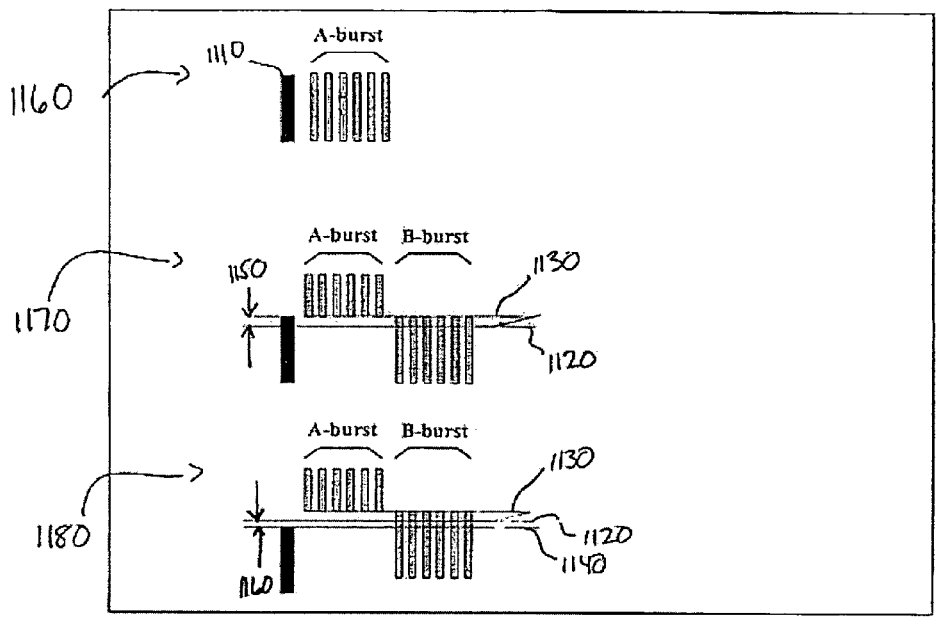
FIG. 11 is a diagram of an exemplary servo-burst pattern being written over a progression of servowriting steps/passes that can benefit from embodiments in accordance with the present invention.
Figure 12:
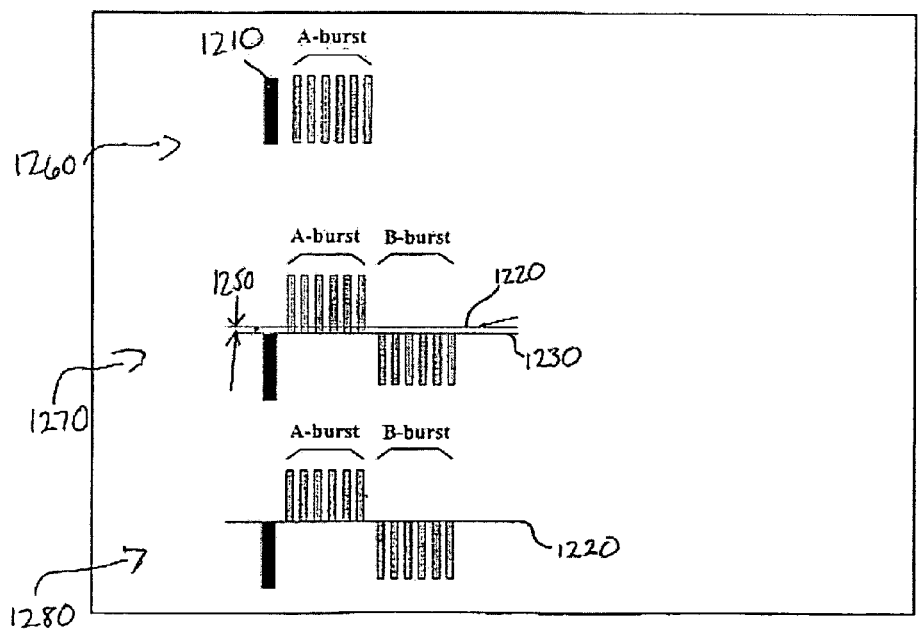
FIG. 12 is a diagram of an exemplary servo-burst pattern being written over a progression of servowriting steps/passes that can benefit from embodiments in accordance with the present invention.

FIGS. 11 and 12 illustrate the progression of exemplary servowriting processes that can benefit from embodiments in accordance with the present invention. In the figures, the top of the page corresponds to locations nearer to an outer diameter (OD) of a disk while the bottom of the page corresponds to locations nearer to an inner diameter (ID) of the disk and servowriting propagation is assumed to be from OD to ID. In other embodiments, propagation may be from ID to OD. Referring now to FIG. 11, write element 1110 writes an A-burst during a first servowriting step 1160. In one embodiment, the A-burst can be written according to the methods illustrated in FIGS. 5 and 6. During a first revolution 1170 of a first pass of a second servowriting step, write element 1110 trims the A-burst and writes a B-burst. When trimming the A-burst and writing the B-burst, the upper edge of the write element is positioned along line 1130, a distance 1150 from the desired location 1120 of the boundary between the A-burst and B-burst. The displacement of the writer, and thus the displacement of the lower edge of the A-burst and the upper edge of the B-burst is against the direction of propagation.

During a second revolution 1180 of the first pass of the second servowriting step, the upper edge of write element 1150 is positioned along line 1140, a distance 1160 towards the inner diameter of the disk. The second trim/write revolution does not affect the boundary between the A-burst and the B-burst, resulting in a boundary at location 1130, rather than desired location 1120.

FIG. 11 illustrates the effects of a position-error in the direction opposite to servowriting propagation. Since the error was against the direction of propagation, it cannot easily be corrected during subsequent attempts at the current radial location for the servowriting step. In order to correct the error in placement of the bursts, the A-burst should either be erased and then re-written or simply re-written, with the write element positioned at the position used in performing the first servowriting step. While it may be possible to correct the error in trimming the A-burst by writing another portion of the same burst across the distance 1150, incoherence may exist between the portions, resulting in erroneous position information when the burst is later demodulated. As the additional RRO that can be introduced by writing multiple portions is undesirable, many drive manufacturers will choose to reposition the write element, erase the burst, and re-write it.

FIG. 12 illustrates the effects of a displacement of a write element or location of servo information in the direction of propagation. In a first servowriting step 1260, write element 1210 writes an A-burst. During a first revolution 1270 of a first pass of a second servowriting step, write element 1210 trims the A-burst and writes a B-burst. When trimming the A-burst and writing the B-burst, an upper edge of the write element was positioned along line 1230, a distance 1250 from the desired location 1220 of the upper edge of the write element, or the desired location of the boundary between the A-burst and B-burst. The displacement of the writer, and thus the displacement of the lower edge of the A-burst and the upper edge of the B-burst, is towards the inner diameter of the disk (in the direction of propagation).

During a second revolution 1280 of the first pass of the second servowriting step, an upper edge of write element 1210 is positioned along the desired location 1220 of the boundary between the A-burst and B-burst. In this revolution, write element 1210 is able to trim the A-burst such that its lower edge is positioned along the desired location 1220 of the boundary. Write element 1210 also re-writes the B-burst such that its upper edge is also positioned along the desired location of the boundary 1220. In another embodiment, the A-burst is trimmed and the B-burst erased during the second revolution of the first pass of the second servowriting step. The B-burst is then re-written during a third revolution of the first pass of the second servowriting step.

As illustrated by FIGS. 11 and 12, displacements of written or trimmed servo information opposite to the direction of servowriting propagation are more difficult to correct. While displacements in the direction of propagation can often be corrected with the write element maintaining its approximate radial position for the current servowriting step or pass, displacements against the direction of propagation can necessitate repositioning the write element. Accordingly, different thresholds for inhibiting writing and/or trimming servo information can be used depending on the direction of the mis-placement of the write element.

In one embodiment, a smaller threshold is used to inhibit writing and/or trimming for position-errors opposite to the direction of propagation. Writing and/or trimming of servo information can be inhibited when a distance between a desired location of to-be-written and/or trimmed servo information and a position (actual or predicted) of the write element to be used in writing and/or trimming the servo information (or a predicted location of to-be-written and/or trimmed servo information) reaches or exceeds a smaller threshold. For displacements in the direction of propagation, a larger threshold can be used to inhibit writing and/or trimming of servo information. If the distance between a desired location of to-be-written and/or trimmed servo information and a position of the write element to be used in writing and/or trimming the servo information is less than the larger threshold, the servo information can be written and/or trimmed. On subsequent passes or revolutions over the wedge where the servo information was written and/or trimmed, the servo information can be re-written or re-trimmed if the write element is in a better position (distance is smaller). If the write element is not in a better position on subsequent passes or revolutions, the originally written and/or trimmed servo information can be kept.

Figure 13:
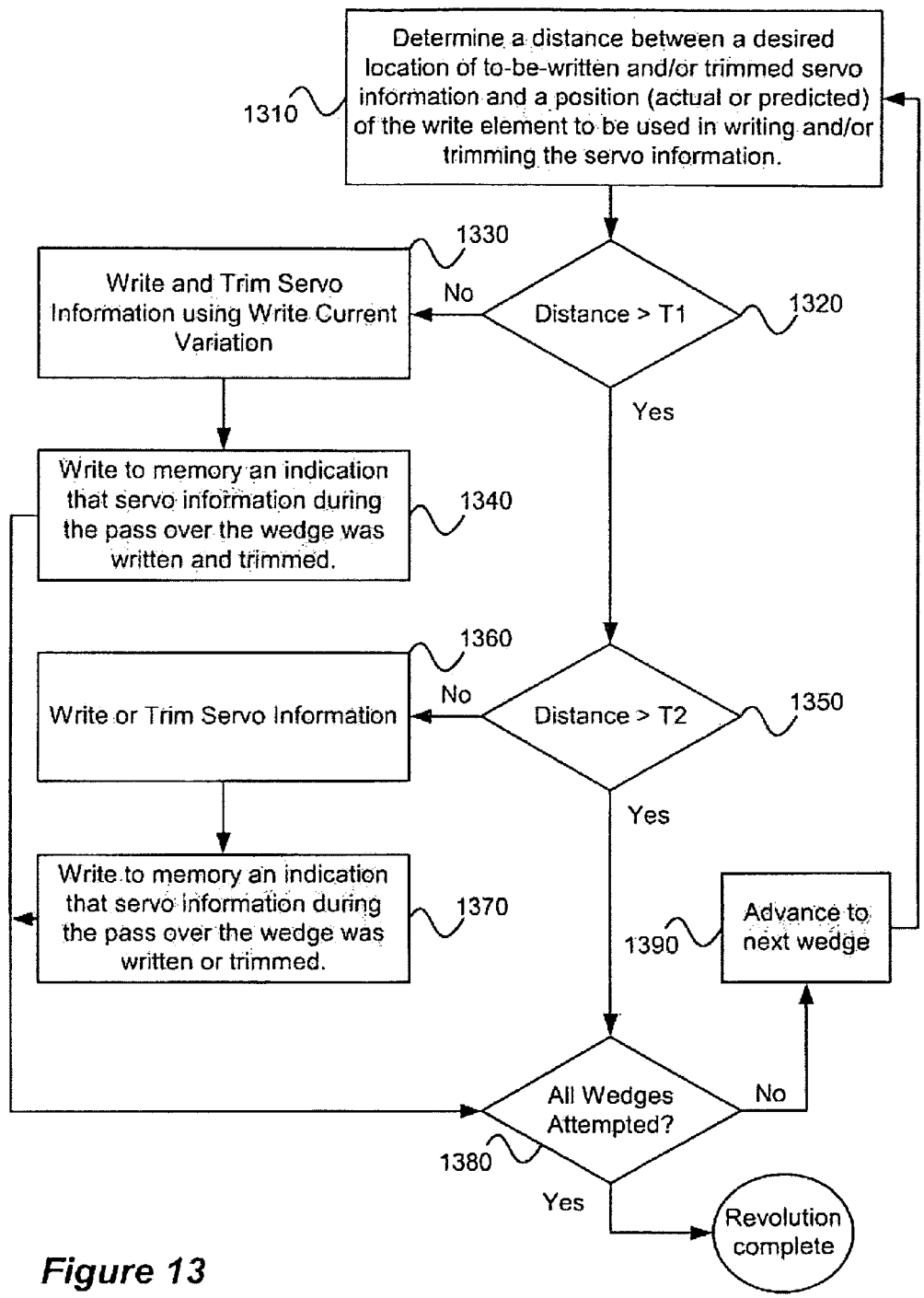
FIG. 13 is a flowchart illustrating a method in accordance with one embodiment of the present invention for performing a revolution of a servowriting pass.

In some embodiments, multiple thresholds can be used during servowriting to determine whether servo information for a servo wedge should be written or trimmed, written and trimmed, or not written or trimmed. For example, referring to FIG. 13, a first threshold, T1, smaller than a second threshold, T2, can be used. For each wedge for which servo information is to be written and trimmed during a servowriting pass, a determination can be made as to whether information should be trimmed and written, trimmed or written, or neither trimmed nor written. For each wedge, a distance between a desired location of to-be-written and/or trimmed servo information and a position (actual or predicted) of the write element to be used in writing and/or trimming the servo information (or a predicted location of to-be-written and/or trimmed servo information) can be determined in step 1310. If it is determined that the distance is less than the smaller threshold T1 in step 1320, indicating that servo information will be written and/or trimmed relatively close to a desired location, servo information for the wedge can be written and trimmed during the revolution of the pass in step 1330. That is, a first burst can be written and a second burst trimmed during the revolution. An indication that the servo information to be written and trimmed during the servowriting step has been written and trimmed can be written to memory in step 1340. The wedge can then be excluded from further servowriting operations during the servowriting step. In one embodiment, the servo information can be re-written and trimmed in a later pass or revolution over the wedge if the write element is in a better position. In some embodiments, the servo information can only easily be re-written and trimmed in a later pass or revolution if the original direction of position-error was in the direction of propagation.

If it is determined that the distance is greater than the smaller threshold T1 but less than the larger threshold T2 in step 1350, either trimming or writing of servo information can take place during the revolution in step 1360. If servo information to be written has been written but servo information to be trimmed has not been trimmed, then the to-be-trimmed servo information can be trimmed. If servo information to be trimmed has been trimmed but servo information to be written has not been written, then the to-be-written servo information can be written. If neither trimming nor writing has been completed, then either can be completed during the pass. The operation not completed can be attempted during a subsequent revolution or pass.

In step 1370, an indication that the servo information was written or trimmed can be written to memory. If it is determined in step 1380 that all wedges for the pass have been attempted, the revolution is complete. If it is determined that all wedges have not been attempted, the method can advance to the next wedge in step 1390 and then repeat.

If it is determined that the distance is greater than the larger threshold T2 in step 1350, neither writing and trimming or writing or trimming will be done. Writing and/or trimming servo information for the wedge can be attempted during a subsequent revolution of the servowriting pass.

Individual passes for trimming and writing servo information can reduce the NRRO that may be written into the servo wedge because of the larger position-error of the write element. If the mis-placement of the writer is due to non-synchronous disturbances, then the mis-placement will likely not be the same for every pass or revolution. For example, the misplacement of a lower edge of an A-burst trimmed in a first pass should not be the same as the misplacement of an upper edge of a corresponding B-burst written in a second pass. The resulting line or centerline defined by the boundary between the two bursts will be the average of the two misplacements.

In one embodiment in accordance with the present invention, the use of thresholds to determine whether to write and/or trim servo information for a wedge during a revolution of a servowriting pass can be combined with other servowriting techniques. Write current variation, for example, can be used to reduce written in runout when a position-error of the write element is relatively small.

The measured position-error of a write element can be analyzed and used to determine an appropriate write current command which can be sent with write data to the current preamp 116, in order to deliver a write current appropriate for the relative position of a head writing servo information. The position measurements from the reference pattern used for servowriting will probably be non-zero, primarily due to imperfect control of the servo position of the reference head, but can be used as a reference for lookup and possible interpolation. A lookup can be done using tables, in which head calibration information and position information can be stored in memory in the hard drive, and used to vary the write-current in order to account for mis-placement of the reference head.

Figure 14:
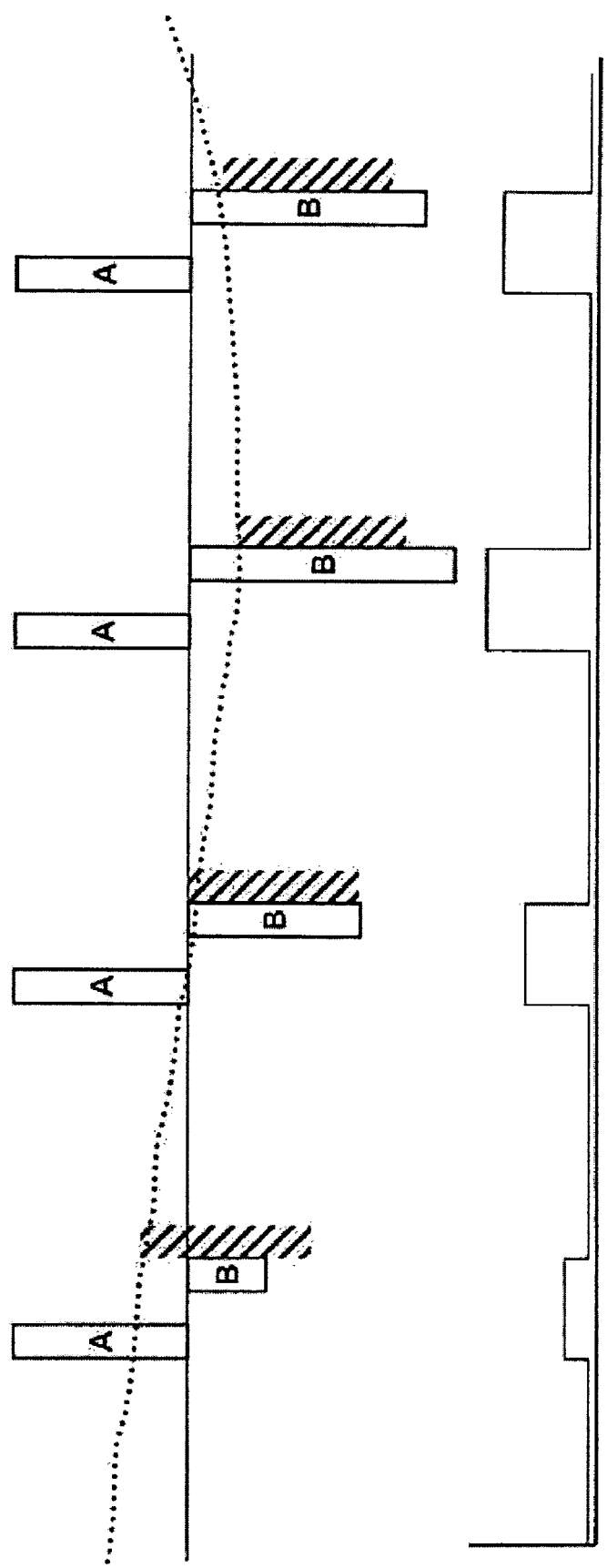
FIG. 14 is a diagram illustrating servo bursts written in accordance with one embodiment of the present invention using write-current variation.

Referring to FIG. 14, a series of A-bursts can be written during a first servowriting step. For the sake of simplicity, it is assumed that all A-bursts are positioned correctly and extend below the desired centerline, such that they can be trimmed during a servowriting step that is performed with a correctly-positioned R/W head. In some embodiments, it can be essential that the writer width be at least a certain percentage of the overall track spacing, such as for example 75%, in order to ensure that the A-bursts extend below the desired centerline. The dotted line in FIG. 14 shows the actual path of the upper edge of the write element of the R/W head during the servowriting pass in which the B-bursts are written. The patterned areas show the width of the B-bursts without width variation.

Using the distance between the desired location of an edge of a yet-to-be written servo burst and a write element, along with calibration information stored in calibration tables, the amount the write current should be adjusted in order to write a burst with an upper edge along the track centerline can be determined. The amount of write current can then be adjusted appropriately and used to write the servo burst. As shown in FIG. 14, the write current can be varied such that the upper edge of each B-burst is approximately positioned along the desired centerline. The magnitude of the variation shown in FIG. 14 is exaggerated for purposes of clarity and understanding. Actual variation may only be on the order of about 10% of the nominal data track spacing. It is to be understood that practically the write current is adjusted between an upper and lower limit determined by the writing characteristics of the head. The upper limit exists when the write current does not give a usably wider burst. The lower limit exists when no usable burst can be written. As can be seen from FIG. 14, a continually adjusting write current not only helps to ensure that the B-bursts are written with the top edge approximately along the desired centerline, but also can ensure that the bottom edge of each A-burst is trimmed approximately along the centerline.

Figure 15:
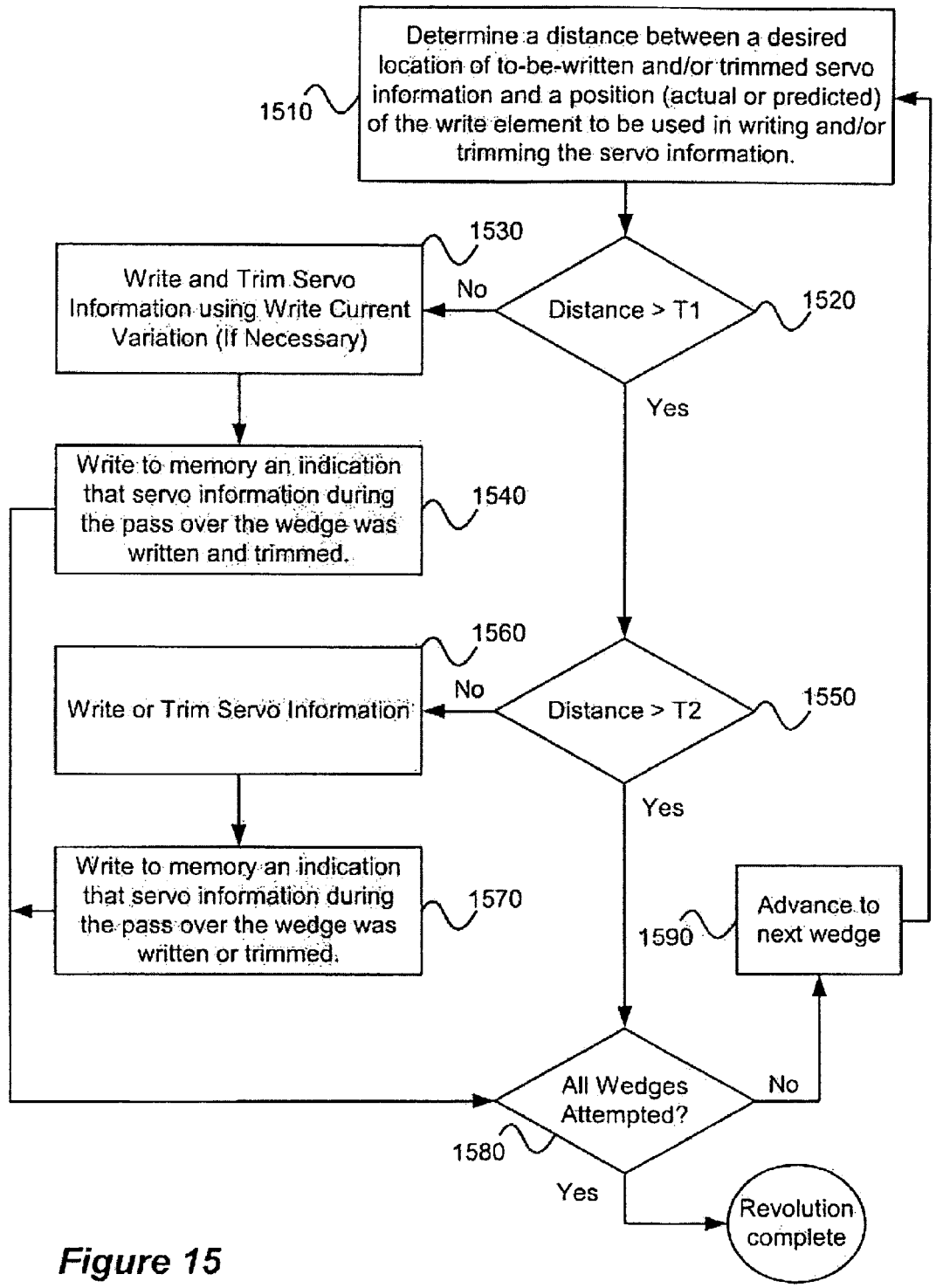
FIG. 15 is a flowchart illustrating a method in accordance with one embodiment of the present invention for performing a revolution of a servowriting pass.

Referring now to FIG. 15, there is illustrated a method for using write current variation in conjunction with thresholds when writing servo information for individual wedges during a revolution of a servowriting pass. A distance between a desired location of to-be-written and/or trimmed servo information for a wedge and a position (actual or predicted) of the write element to be used in writing and/or trimming the servo information (or a predicted location of to-be-written and/or trimmed servo information) can be determined 1510. It is then determined if the distance is greater than a first threshold, T1 (step 1520). If the distance is not greater than T1, the servo information for the wedge can be written and trimmed using write current variation, if necessary, to compensate for the distance 1530. After writing and trimming the servo information, an indication can be written to memory that the servo information to-be-written and trimmed during the pass over the wedge was written and trimmed 1540.

If the distance determined in step 1510 is greater than T1, it is determined whether the distance is greater than a second threshold, T2 (step 1550). If it is determined that the distance is not greater than T2, servo information for the wedge can be written or trimmed 1560. In one embodiment, write current variation can also be used at this step to minimize the written in runout that may be caused by writing or trimming servo information when the head is positioned a distance from a desired location. An indication can then be written to memory that servo information was written or trimmed for the wedge 1570. The operation not performed can be attempted during a subsequent revolution or pass.

If the distance is greater than T2, servo information is not written or trimmed for the wedge during the revolution. In step 1580, it is determined whether all wedges to be written and/or trimmed during the revolution have been attempted. If there are remaining wedges to be attempted during the revolution, the method can advance to a next wedge for which servo information is to be written and/or trimmed 1590. The method can then repeat until writing and/or trimming of servo information to be written and/or trimmed for each wedge during the pass has been attempted.

In one embodiment, the threshold for using write current variation is determined by the characteristics of the head or write element. A threshold can be set to a value equal to the position-error for which an adjusted write current is able to compensate. In one embodiment, two thresholds are used depending on the direction of the position-error of the write element. For example, if a write element is capable of writing a burst 0.05 microns wider than the width of the head using an increased write current, a threshold can be set to a value of 0.025 microns (since the increased width will be in both directions of the width of the head, the increased write current can only write a 0.025 micron wider burst in one direction). This threshold can be used for a first situation where an edge of the write element is positioned a distance away from a desired edge of to-be-written or trimmed information and the write element does not overlap the desired edge of the to-be-written or to-be-trimmed information, as illustrated by the third burst from the left in FIG. 14. A second threshold can be used for a second situation where an edge of the write element is positioned a distance away from a desired edge of to-be-written or trimmed information and the write element does overlap the desired edge of the to-be-written or to-be-trimmed information, as illustrated by the first burst from the left in FIG. 14. This second threshold can be set to a value equal to one half of the decreased burst width the head is capable of writing using a decreased write current.

Although embodiments described herein refer generally to systems having a read/write head that can be used to write bursts on rotating magnetic media, other embodiments of the invention can take advantage of similar variation, such as variations in drive current or drive voltage. For example, a laser writing information to an optical media can be driven with variable power in order to increase or decrease pit width in the media in order to reduce track variation. Any media, or at least any rotating media, upon which information is written, placed, or stored, may be able to take advantage of embodiments of the invention, as variations in optical, electrical, magnetic, mechanical, and other physical systems can be made by varying a drive signal or other control in order to reduce track misplacement.

In many servowriting techniques, information regarding a reference pattern, such as the written-in runout of a reference track, is gathered before writing servo information to a target location. Such information can be used during servowriting to reduce the written-in runout of servo information written to a target location such as servo information written to the final servo wedges of a target track.

In one approach, this information is gathered by examining a number of parameters over a number of revolutions. These parameters can include the distance between the desired track centerline of a reference track and the apparent centerline obtained from demodulating the burst pattern. Various methods, known to those of ordinary skill in the art, can be used to determine this distance. Examples of such methods and other related systems and methods can be found in U.S. Pat. No. 6,097,565 to Sri-Jayantha et al., entitled: "Repeatable runout free servo architecture in direct access storage device;" U.S. Pat. No. 6,061,200 to Shepherd et al., entitled "In-drive correction of servo pattern errors;" U.S. Pat. No. 5,978,169 to Woods et al., entitled "Repeated servo runout error compensation in a disc drive;" U.S. Pat. No. 6,310,742 to Nazarian et al., entitled "Repeatable runout cancellation in sectored servo disk drive positioning system;" Morris, et al., U.S. Pat. No. 6,449,116, "Compression and Storage of Written-In Compensation Tables in an Embedded Servo Disc Drive"; Morris et al., U.S. Pat. No. 6,069,764 "Compensation for Repeatable Run-Out Error"; Chen et al., U.S. Pat. No. 6,437,936 "Repeatable Runout Compensation Using A Learning Algorithm with Scheduled Parameters", and Bi et al., U.S. Pat. No. 6,563,663 "Repeatable Runout Compensation Using Iterative Learning Control in A Disc Storage System", the disclosures of which are incorporated by reference herein.

Information regarding this determined distance will be referred to herein as Wedge Offset Reduction Field (WORF) data. WORF data can be applied to a servo controller to reduce the runout that would otherwise be written into target tracks during the servowriting process. WORF data can be, for example, a digital number for a servo wedge on a given reference track that includes an amount that should be added to, or subtracted from, the PES value for that wedge on that track obtained from demodulating the bursts. The servo can use the WORF value, add the value to the computed PES, and presumably follow a more accurate track. Applying the WORF data to the PES observed from the reference track can help to more accurately position the write element during the servowriting process in order to reduce runout written into tracks on the target disk or track.

WORF data can be obtained, for example, by observing several revolutions of the PES and combining the PES with servo loop characteristics to estimate the written-in runout, such as of the reference track. In one embodiment, the PES can be synchronously averaged and then combined with servo loop characteristics to estimate the written-in runout. Various measurements can be made, as are known in the art, to characterize servo loop characteristics. Because the servo typically suffers both synchronous and non-synchronous runout, any measurement intended to determine the synchronous runout will be affected by the non-synchronous runout. If many revolutions of PES data are synchronously averaged, the effects of the non-synchronous runout can lessen, leaving substantially only synchronous runout. This allows better determination of, and subsequent elimination of, the written-in runout.

In one embodiment in accordance with the present invention, additional information regarding the written-in runout of the reference disk or track, is gathered during revolutions required for the write element to settle to an acceptable position, or during an attempt to write the final wedges. The additional information can be used to update and re-compute any previously determined WORF data or can be used to establish initial WORF data if WORF data was not used in previous attempts. The new or updated WORF data can be used while writing servo information during subsequent revolutions such that the write element can be positioned more accurately.

Figure 16:
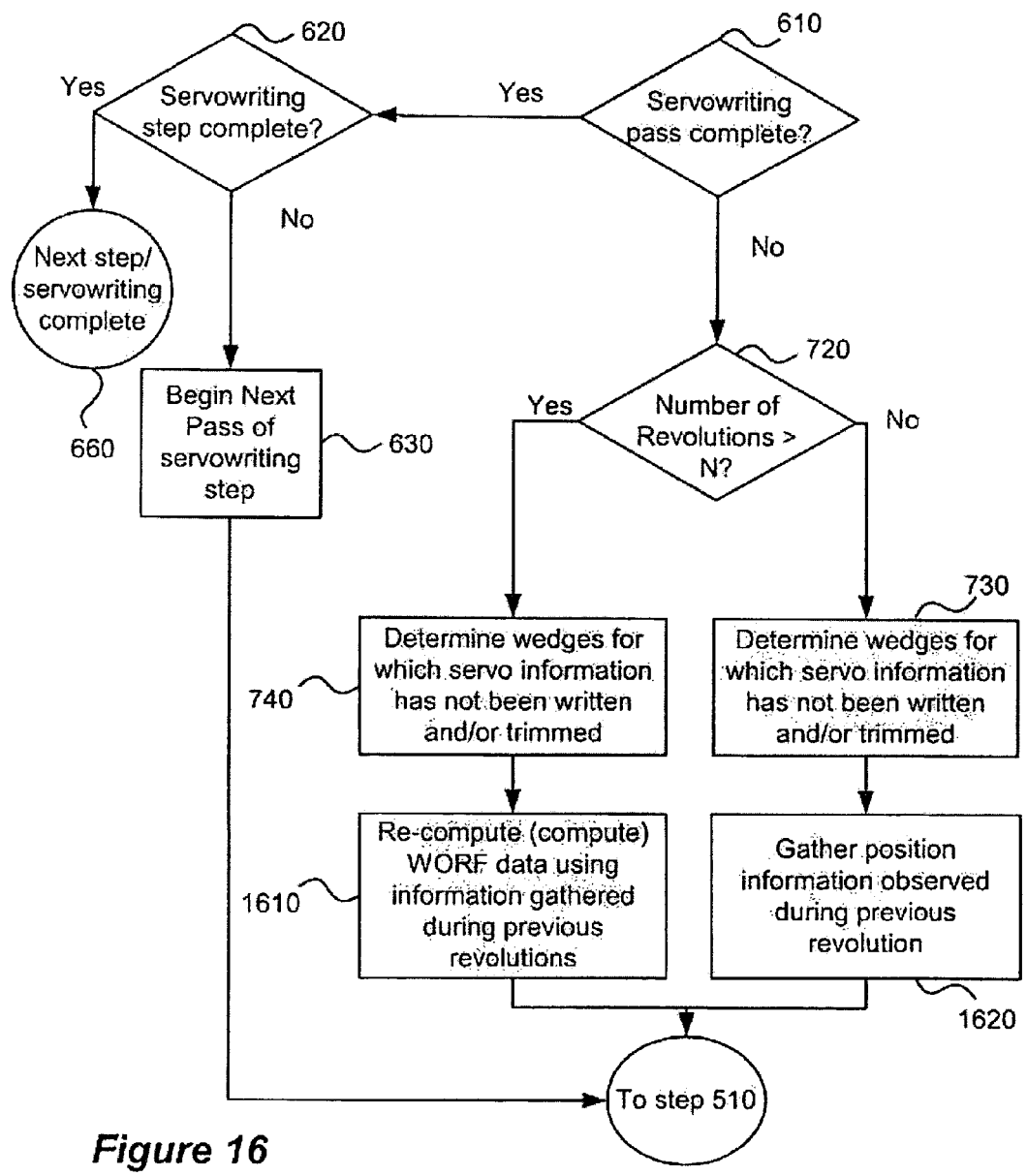
FIG. 16 is a flowchart illustrating a method in accordance with one embodiment of the present invention for determining WORF data using data gathered during revolutions of a servowriting pass.

Referring to FIG. 16, there is illustrated a method in accordance with one embodiment of the present invention for re-determining WORF data (or determining WORF data if no WORF data has been previously determined) to allow later writing of servo wedges having servo information not written and/or trimmed during previous revolutions. After completing a revolution (which can be performed in accordance with the method illustrated in FIG. 5), it is determined whether all servo information to be written and/or trimmed during the pass was written and/or trimmed 610. If it is determined that all servo information was not written and/or trimmed, the number of revolutions can be compared to a predetermined number of revolutions N (step 720). If the number of revolutions is not greater than N, the wedges for which servo information to-be-written and/or trimmed during the pass has not been written and/or trimmed are determined 730. After the wedges are determined, position information observed while attempting to write and/or trim servo information during the previous revolution can be gathered 1620. The information, which can include position-error information such as the PES value observed during the previous passes over the reference pattern, can be written to memory for possible later use in determining WORF data.

If the number of passes is greater than N, the wedges for which servo information to-be-written and/or trimmed during the pass has not been written and/or trimmed can be determined 740. WORF data can be determined in step 1610 using position-error information gathered during previous revolutions. For example, position information observed during the previous revolutions can be synchronously averaged to re-compute WORF data. In embodiments where WORF data was determined prior to beginning the pass, the position information observed during the revolutions can be combined with previously determined WORF data. If WORF data was not determined or used prior to beginning the passes, initial WORF data can be determined at step 1610. After computing or re-computing the WORF data, servo information for the wedges for which servo information is to be written and/or trimmed can be attempted to be written and/or trimmed during a subsequent revolution according to the method illustrated in FIG. 5 using the WORF data.

Various schemes for determining and applying WORF data can be used in accordance with embodiments of the present invention. For example, WORF data can include WORF data determined for individual wedges of the reference track. The WORF data can then be applied on a wedge-by-wedge basis while writing a target track. In other embodiments, WORF data can include WORF data for an entire reference track. The WORF data can then be applied while writing a corresponding target track. In yet other embodiments, WORF data can include WORF data for various circumferential locations around a reference track.

The number of revolutions, N, used to determine when to re-compute WORF data can vary by embodiment and by the needs of various applications. In one embodiment, for example, the number of revolutions is 4. In other embodiments, WORF data can be re-computed after a different number of revolutions.

The re-computing of the WORF data can be done a number of ways. In one embodiment, a new WORF value is determined using an iterative solution application gain parameter, $\alpha$, between zero and one where:

New WORF value=old WORF value+$\alpha$(residual WORF estimate)

Since the adaptation gain parameter has a value between zero and one, only a fraction of the derived compensation value is used to adjust the compensation value used by the servo loop. This causes the servo loop's compensation value to increase in a controlled manner. Shepherd et al., U.S. Pat. No. 6,061,200 "In-drive Correction of Servo Pattern Errors", incorporated herein by reference, describe one example of such an iterative solution, see especially Column 6, lines 34–60. in that document, the quantity referred to here as the "residual WORF estimate" is referred to as "err(t) kernel" where err(t) is defined as the tracking error, the kernel is a representation of servo loop dynamics and is the convolution operator. The application gain parameter, $\alpha$, can be frequency dependent.

Other methods of recalculating the WORF values can be done as described in Morris, et al., U.S. Pat. No. 6,449,116, "Compression and Storage of Written-In Compensation Tables in an Embedded Servo Disc Drive"; Morris et al., U.S. Pat. No. 6,069,764 "Compensation for Repeatable Run-Out Error"; Chen et al., U.S. Pat. No. 6,437,936 "Repeatable Runout Compensation Using A Learning Algorithm with Scheduled Parameters", and Bi et al., U.S. Pat. No. 6,563,663 "Repeatable Runout Compensation Using Iterative Learning Control in A Disc Storage System", which are incorporated herein by reference.

Many features of the present invention can be performed using hardware, software, firmware, or combinations thereof. Consequently, features of the present invention may be implemented using a control mechanism including one or more processors, a disk controller, or servo controller within or associated with a disk drive (e.g., disk drive 100). The control mechanism can include a processor, disk controller, servo controller, or any combination thereof. In addition, various software components can be integrated with or within any of the processor, disk controller, or servo controller.

Features of the present invention can be implemented in a computer program product which is a storage medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention can include software for controlling both the hardware of the general purpose/specialized computer, microprocessor, or disk drive, and for enabling the computer or microprocessor to interact with a human user or other mechanism utilizing the results of the present invention. Such software and/or firmware may include, but is not limited to, application code, device drivers, operating systems, execution environments/containers.

Features of the invention may also be implemented exclusively or primarily in hardware using, for example, hardware components such as application specific integrated circuits (ASICs). Implementation of the hardware state machine so as to perform the functions described herein will be apparent to persons skilled in the relevant art(s).

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

It will be apparent to those of ordinary skill in the art that various methods and operations described herein can be combined into additional methods and operations, all considered within the scope of the present invention. For example, the concept of multiple thresholds for different directions of position-error of the write element can be combined with the concept of multiple thresholds for determining whether to write and trim, write or trim, or neither write nor trim. The direction of position-error coupled with the amount of position-error can be used to determine what operation to perform.

Although various embodiments of the present invention, including exemplary and explanatory methods and operations, have been described in terms of multiple discrete steps performed in turn, the order of the descriptions should not necessarily be construed as to imply that the embodiments are order dependent. Where practicable for example, various operations can be performed in alternative orders than those presented herein.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system to write a target track of servo information to a rotatable storage medium using a reference track of servo information, comprising:
   a write element adapted to write servo information to the rotatable storage medium;
   a control mechanism adapted to control writing of servo information to the rotatable storage medium, the control mechanism to:
   enable writing of servo information to the target track of the rotatable storage medium by the write element during one or more revolutions of the rotatable storage medium, wherein writing servo information is inhibited when a location of the write element is not within a first threshold distance of a desired location, and wherein writing servo information is resumed after the location of the write element is determined to be within a second threshold distance;
   determine WORF data from the reference track of servo information during the one or more revolutions; and
   enable writing of servo information not written to the target track during the one or more revolutions during a subsequent revolution using the WORF data.

2. The system of claim 1, wherein first and second threshold distance are the same.

3. The system of claim 1, wherein first and second threshold distance are different.

4. The system of claim 1, wherein the location is a predicted location.

5. The system of claim 1, where the location is a measured location.

6. The system of claim 1, wherein the reference track of servo information is located on the rotatable storage medium.

7. The system of claim 1, wherein the reference track of servo information includes a plurality of servo wedges and wherein the control mechanism determines WORF data for each of the servo wedges.

8. The system of claim 1, wherein the control mechanism determines WORF data from the reference track by determining position information as a read element reads the reference track of servo information during the one or more revolutions.

9. The system of claim 1, wherein the control mechanism determines WORF data from the reference track by combining position information determined as a read element reads the reference track of servo information during the one or more revolutions with WORF data determined prior to the one or more revolutions.

10. The system of claim 1, wherein writing of servo information includes at least one of writing servo information and trimming servo information.

11. The system of claim 1, wherein the control mechanism is further to:
   write to memory an indication of servo information that was written to the target track during the one or more revolutions.

12. The system of claim 1, wherein the control mechanism is further to:
   increase the second threshold distance when the target track of servo information is not written after a number of revolutions of the rotatable storage medium.

13. The system of claim 1, wherein the control mechanism is further to:
   increase the first threshold distance when the target track of servo information is not written after a number of revolutions of the rotatable storage medium.

14. The system of claim 1, wherein the control mechanism includes at least one of a disk controller, a microprocessor, and a servo controller.

15. A system to write a target track of servo information to a rotatable storage medium having a plurality of servo wedges, comprising:
   a reference track of servo information;
   a head adapted to read the reference track of servo information;
   a write element adapted to write servo information to the rotatable storage medium using the reference track of servo information;

a control mechanism adapted to control writing of servo information to the rotatable storage medium, the control mechanism to:

determine a position error signal generated as the head reads the reference track of servo information;

inhibit writing of servo information to the target track by the write element during one or more revolutions of the rotatable storage medium when a value of the position error signal exceeds a first threshold value;

determine at least a second value of the position error signal during the one or more revolutions when writing is inhibited, wherein writing can be resumed during the one or more revolutions for the target track after the second value is within a second threshold value;

determine WORF data from the reference track of servo information during the one or more revolutions; and enable writing of servo information not written to the target track during the one or more revolutions during a subsequent revolution using the WORF data.

16. The system of claim 15, wherein first and second threshold value are the same.

17. The system of claim 15, wherein first and second threshold value are different.

18. The system of claim 15, wherein the control mechanism determines WORF data from the reference track of servo information by determining position information from the position error signal generated as the read element reads the reference track of servo information during the one or more revolutions.

19. The system of claim 15, wherein the control mechanism determines WORF data from the reference track of servo information by combining position information determined from the position error signal generated as the read element reads the reference track of servo information during the one or more revolutions with WORF data determined prior to the one or more revolutions.

20. A system to write a target track of servo information to a rotatable storage medium having a plurality of servo wedges using a reference track of servo information, comprising:

a write element adapted to write servo information to the rotatable storage medium;

a control mechanism adapted to control writing of servo information to the rotatable storage medium, the control mechanism to:

determine a first distance between a first location of the write element and a first desired write location during one or more revolutions of the rotatable storage medium;

inhibit writing of servo information for the target track during the one or more revolutions when the first distance exceeds a first threshold distance, wherein at least a second distance between a second location of the write element and a second desired write location is determined when writing is inhibited, whereby writing can be resumed for the target track when the second distance is within a second threshold distance;

determine WORF data from the reference track of servo information during the one or more revolutions; and enable writing of servo information not written to the target track during the one or more revolutions during a subsequent revolution using the WORF data.

21. A system to servowrite a target track of a rotatable storage medium having a plurality of servo wedges using a reference track of servo information, comprising:

a write element adapted to write servo information to the rotatable storage medium;

a control mechanism adapted to control writing of servo information to the rotatable storage medium, the control mechanism to:

determine a distance between a desired location of servo information for each of the servo wedges and a location of the write element during one or more revolutions of the rotatable storage medium;

determine whether the distance is greater than a threshold distance;

inhibit writing of servo information for each of the servo wedges for which the distance is greater than the threshold distance during the one or more revolutions;

determine WORF data from the reference track of servo information during the one or more revolutions;

enable writing of servo information for each of the servo wedges for which writing was inhibited during the one or more revolutions during a subsequent revolution using the WORF data.

22. A system to servowrite a rotatable storage medium having a plurality of servo wedges using a reference track of servo information, comprising:

a write element adapted to write servo information to the rotatable storage medium;

a control mechanism adapted to control writing of servo information to the rotatable storage medium, the control mechanism, for each of the servo wedges, to:

determine a distance between a desired location of servo information to be written for the servo wedge and a location of the write element during one or more revolutions of the rotatable storage medium;

determine whether the distance is greater than a threshold distance;

inhibit writing of servo information for the servo wedge during the one or more revolutions when the distance is greater than the threshold distance;

determine WORF data from the reference track of servo information during the one or more revolutions; and enable writing of servo information for the servo wedge during a subsequent revolution using the WORF data if writing servo information for the servo wedge was inhibited during the one or more revolutions.

23. A system to servowrite a target track of a rotatable storage medium having a plurality of servo wedges using a reference track of servo information, comprising:

a write element adapted to write servo information to the rotatable storage medium;

a control mechanism adapted to control writing of servo information to the rotatable storage medium, the control mechanism to:

determine a distance between a desired location of servo information for each of the servo wedges at the target track and a location of the write element during one or more revolutions of the rotatable storage medium;

determine whether the distance is greater than a threshold distance;

inhibit writing of servo information for each of the servo wedges at the target track for which the distance is greater than the threshold distance during the one or more revolutions;

determine WORF data from the reference track of servo information during the one or more revolutions;

enable writing of servo information for each of the servo wedges at the target track for which writing was inhibited during the one or more revolutions during a subsequent revolution using the WORF data.

24. A system to servowrite a target track of a rotatable storage medium having a plurality of servo wedges using a reference track of servo information, comprising:
- a write element adapted to write servo information to the rotatable storage medium;
- a control mechanism adapted to control writing of servo information to the rotatable storage medium, the control mechanism, for each of the servo wedges, to:
- determine a distance between a desired location of servo information to be written for the servo wedge at the target track and a location of the write element during one or more revolutions of the rotatable storage medium;
- determine whether the distance is greater than a threshold distance; and
- inhibit writing of servo information to the servo wedge at the target track during the one or more revolutions when the distance is greater than the threshold distance;
- determine WORF data from the reference track of servo information during the one or more revolutions; and
- enable writing of servo information for the servo wedge at the target track during a subsequent revolution using the WORF data if writing servo information for the servo wedge was inhibited during the one or more revolutions.

25. A system to perform a servowriting pass for a rotatable storage medium having a plurality of servo wedges using a reference track of servo information, comprising:
- a write element adapted to write servo information to the rotatable storage medium;
- a control mechanism adapted to control writing of servo information to the rotatable storage medium, the control mechanism to:
- determine a distance between a desired location of servo information to be written during the servowriting pass for each of the servo wedges and a location of the write element during one or more revolutions of the rotatable storage medium;
- determine whether the distance is greater than a threshold distance;
- inhibit writing of servo information to be written during the servowriting pass for each of the servo wedges for which the distance is greater than the threshold distance during the one or more revolutions;
- determine WORF data from the reference track of servo information during the one or more revolutions;
- enable writing of servo information to be written during the servowriting pass for each of the servo wedges at the target track for which writing was inhibited during the one or more revolutions during a subsequent revolution using the WORF data.

26. A system to perform a servowriting pass for a rotatable storage medium having a plurality of servo wedges using a reference track of servo information, comprising:
- a write element adapted to write servo information to the rotatable storage medium;
- a control mechanism adapted to control writing of servo information to the rotatable storage medium, the control mechanism, for each of the servo wedges, to:
- determine a distance between a desired location of servo information to be written for the servo wedge during the servowriting pass and a location of the write element during one or more revolutions of the rotatable storage medium;
- determine whether the distance is greater than a threshold distance;
- inhibit writing of servo information to be written for the servo wedge during the servowriting pass during the one or more revolutions when the distance is greater than the threshold distance;
- determine WORF data from the reference track of servo information during the one or more revolutions; and
- enable writing of servo information to be written for the servo wedge during the servowriting pass during a subsequent revolution using the WORF data if writing servo information to be written for the servo wedge during the servowriting pass was inhibited during the one or more revolutions.

27. A system to write a target track of servo information to a rotatable storage medium using a reference track of servo information, comprising:
- a write element adapted to write servo information to the rotatable storage medium;
- a control mechanism adapted to control writing of servo information to the rotatable storage medium, the control mechanism to:
- enable writing of servo information to the target track of the rotatable storage medium by the write element during one or more revolutions of the rotatable storage medium, wherein writing servo information is inhibited when a predicted location of the write element is not within a first threshold distance of a desired location, and wherein writing servo information is resumed after the predicted location of the write element is determined to be within a second threshold distance;
- determine WORF data from the reference track of servo information during the one or more revolutions; and
- enable writing of servo information not written to the target track during the one or more revolutions during a subsequent revolution using the WORF data.

28. The system of claim 27, wherein first and second threshold distance are the same.

29. The system of claim 27, wherein first and second threshold distance are different.

30. The system of claim 27, wherein the reference track of servo information is located on the rotatable storage medium.

31. The system of claim 27, wherein the reference track of servo information includes a plurality of servo wedges and wherein the control mechanism determines WORF data for each of the servo wedges.

32. The system of claim 27 position information as a read element reads the reference track of servo information during the one or more revolutions.

33. The system of claim 27, wherein the control mechanism determines WORF data from the reference track by combining position information determined as a read element reads the reference track of servo information during the one or more revolutions with WORF data determined prior to the one or more revolutions.

34. The system of claim 27, wherein writing of servo information includes at least one of writing servo information and trimming servo information.

35. The system of claim 27 wherein the control mechanism is further to:
- write to memory an indication of servo information that was written to the target track during the one or more revolutions.

36. The system of claim 27, wherein the control mechanism is further to:
- increase the second threshold distance when the target track of servo information is not written after a number of revolutions of the rotatable storage medium.

37. The system of claim 27, wherein the control mechanism includes at least one of a disk controller, a microprocessor, and a servo controller.

* * * * *

(12) EX PARTE REEXAMINATION CERTIFICATE (8125th)
United States Patent
Ehrlich

(10) Number: US 6,995,940 C1
(45) Certificate Issued: Mar. 29, 2011

(54) SYSTEMS FOR WORF IMPROVEMENT IN CONDITIONAL SERVOWRITING

(75) Inventor: Richard M. Ehrlich, Saratoga, CA (US)

(73) Assignee: Matsushita Electric Industrial Co., Ltd., Kadoma-shi, Osaka (JP)

Reexamination Request:
No. 90/008,302, Oct. 27, 2006

Reexamination Certificate for:
Patent No.: 6,995,940
Issued: Feb. 7, 2006
Appl. No.: 10/897,319
Filed: Jul. 22, 2004

Related U.S. Application Data

(60) Provisional application No. 60/489,025, filed on Jul. 22, 2003.

(51) Int. Cl.
*G11B 21/02* (2006.01)
*G11B 19/00*

(52) U.S. Cl. .......................... 360/75; 360/60; 360/77.04; 360/77.08

(58) Field of Classification Search ........................ None
See application file for complete search history.

(56) References Cited

U.S. PATENT DOCUMENTS

| 4,354,208 A | 10/1982 | Maury |
| 4,484,238 A | 11/1984 | Vinal |
| 4,549,232 A | 10/1985 | Axmear et al. |

(Continued)

FOREIGN PATENT DOCUMENTS

| JP | 61211814 | 9/1986 |
| JP | 63025803 | 2/1988 |
| JP | 10334402 | 12/1998 |

OTHER PUBLICATIONS

Ishida, Tatsuaki, et al., "Demodulation of Servo Tracking Signals Printed with a Lithographically Patterned Master Disk," *IEEE Transactions on Magnetics*, vol. 37, No. 4, Jul. 2001, pp. 1412–1415.

Ishida, Tatsuaki, et al., "Printed Media Technology for an Effective and Inexpensive Servo Track Writing of HDDs," *IEEE Transactions on Magnetics*, vol. 37, No. 4, Jul. 2001, pp. 1875–1877.

Ono, H. "Architecture and Performance of the ESPER-2 Hard-Disk Drive Servo Writer," IBM J. Res. Develop., vol. 37, No. 1, Jan. 1993, pp. 3–11.

Saito, Akira et al., "Optimization of a Magnetic Printing Process by Computer Simulation," *IEEE Transactions on Magneticss*, vol. 37, No. 4, Jul. 2001, pp. 1389–1392.

"Minimizing Effects of Vibration at Servowrite", IBM Technical Disclosure Bulletin, pp. 129–130 (Sep. 1988).

*Primary Examiner*—Sam Rimell

(57) ABSTRACT

To account for head misplacement while servowriting, conditional writing and/or trimming of servo information can be used. Conditional servowriting allows servowriting to be disabled when it is determined that servo information will not be written and/or trimmed at a desired location or within a threshold distance of a desired location. For example, if a distance between a write element or a predicted location of servo information and a desired location of the servo information or write element exceeds a threshold, writing and/or trimming can be inhibited. Servowriting can be resumed when it is determined that servo information will be written or trimmed at a desired location or within a threshold distance of a desired location. A servowriting step or pass is not re-started when the threshold is exceeded and those wedges for which servo information was not written and/or trimmed can be attempted during subsequent revolutions of the rotatable storage medium. Various methods can also be used to account for servo information that is not written and/or trimmed after a number of revolutions, including increasing threshold(s), writing and/or trimming unconditionally, and re-computing WORF values for a reference disk. Additionally, other techniques including write current variation and individual passes for writing and trimming can be used with various embodiments using conditional writing techniques.

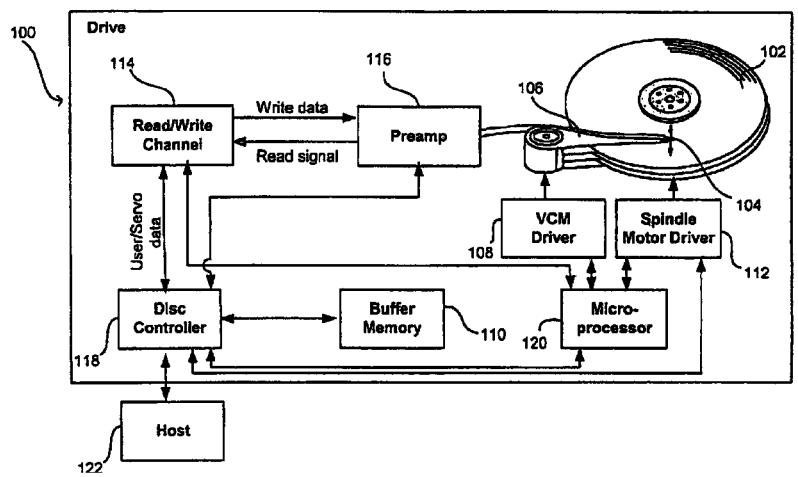

U.S. PATENT DOCUMENTS

| | | | |
|---|---|---|---|
| 5,012,363 A | 4/1991 | Mine et al. |
| 5,107,378 A | 4/1992 | Cronch et al. |
| 5,293,281 A | 3/1994 | Behr et al. |
| 5,339,207 A | 8/1994 | Moon et al. |
| 5,381,281 A | 1/1995 | Shrinkle et al. |
| 5,392,174 A | 2/1995 | Suzuki |
| 5,553,086 A | 9/1996 | Sompel et al. |
| 5,570,247 A | 10/1996 | Brown et al. |
| 5,612,833 A | 3/1997 | Yarmchuk et al. |
| 5,668,679 A | 9/1997 | Swearingen et al. |
| 5,691,857 A | 11/1997 | Fitzpatrick et al. |
| 5,771,131 A | 6/1998 | Pirzadeh |
| 5,793,559 A | 8/1998 | Shepherd et al. |
| 5,825,578 A | 10/1998 | Shrinkle et al. |
| 5,862,005 A | 1/1999 | Leis |
| 5,907,450 A | 5/1999 | Ishikawa |
| 5,940,240 A | 8/1999 | Kupferman |
| 5,946,157 A | 8/1999 | Codilian et al. |
| 5,946,158 A | 8/1999 | Nazarian et al. |
| 5,949,603 A | 9/1999 | Brown et al. |
| 5,956,196 A | 9/1999 | Hull |
| 5,966,264 A | 10/1999 | Belser et al. |
| 5,978,169 A | 11/1999 | Woods |
| 5,982,173 A | 11/1999 | Hagen |
| 6,023,389 A | 2/2000 | Cunningham |
| 6,025,970 A | 2/2000 | Cheung |
| 6,040,955 A | 3/2000 | Brown et al. |
| 6,091,564 A | 7/2000 | Codilian et al. |
| 6,091,567 A | 7/2000 | Cooper et al. |
| 6,097,565 A | 8/2000 | Sri-Jayantha et al. |
| 6,101,053 A | 8/2000 | Takahashi |
| 6,118,614 A | 9/2000 | Lee |
| 6,198,583 B1 | 3/2001 | Ohinata et al. |
| 6,226,140 B1 | 5/2001 | Serrano et al. |
| 6,243,224 B1 | 6/2001 | Sacks et al. |
| 6,304,407 B1 | 10/2001 | Baker et al. |
| 6,310,742 B1 | 10/2001 | Nazarian et al. |
| 6,369,971 B1 | 4/2002 | Everett |
| 6,411,459 B1 | 6/2002 | Belser et al. |
| 6,445,521 B1 | 9/2002 | Schaff et al. |
| 6,476,989 B1 | 11/2002 | Chainer et al. |
| 6,493,173 B1 | 12/2002 | Kim et al. |
| 6,493,176 B1 | 12/2002 | Deng et al. |
| 6,496,315 B1 | 12/2002 | Ueda et al. |
| 6,519,107 B1 | 2/2003 | Ehrlich et al. |
| 6,542,325 B1 | 4/2003 | Molstad et al. |
| 6,567,227 B2 | 5/2003 | Ishida et al. |
| 6,600,620 B1 | 7/2003 | Krounbi et al. |
| 6,628,471 B1 | 9/2003 | Min et al. |
| 6,631,046 B2 | 10/2003 | Szita et al. |
| 6,654,198 B2 | 11/2003 | Liu et al. |
| 6,671,119 B2 | 12/2003 | Baumann et al. |
| 6,704,156 B1 | 3/2004 | Baker et al. |
| 6,738,205 B1 | 5/2004 | Moran et al. |
| 6,738,215 B2 | 5/2004 | Yatsu |
| 6,754,016 B2 | 6/2004 | Messner et al. |
| 6,760,185 B1 | 7/2004 | Roth et al. |
| 6,791,780 B2 | 9/2004 | Lee et al. |
| 6,842,305 B2 | 1/2005 | Molstad et al. |
| 6,904,010 B1 | 6/2005 | Kuroba et al. |
| 6,922,304 B2 | 7/2005 | Nakagawa |
| 6,924,961 B1 | 8/2005 | Melkote et al. |
| 6,940,677 B2 | 9/2005 | Fukushima |
| 6,954,325 B2 | 10/2005 | Liu |
| 6,957,379 B1 | 10/2005 | Patapoutian et al. |
| 6,963,458 B2 | 11/2005 | Lamberts |
| 6,977,792 B1 | 12/2005 | Melrose et al. |
| 6,987,632 B2 | 1/2006 | Ehrlich |
| 6,995,937 B2 | 2/2006 | Ehrlich |
| 6,995,940 B2 | 2/2006 | Ehrlich |
| 6,995,942 B2 | 2/2006 | Schmidt |
| 7,042,827 B2 | 5/2006 | Cho et al. |
| 7,089,353 B2 | 8/2006 | Chainer et al. |
| 7,099,105 B2 | 8/2006 | Ehrlich |
| 7,180,695 B2 | 2/2007 | Ehrlich |
| 2003/0112545 A1 | 6/2003 | Hanson et al. |
| 2003/0123174 A1 | 7/2003 | Hennecken et al. |
| 2003/0197969 A1 | 10/2003 | Szita et al. |
| 2005/0237656 A1 | 10/2005 | Ehrlich |
| 2006/0018051 A9 | 1/2006 | Chaio et al. |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-20 and 27-37 is confirmed.

Claims 21-26 are cancelled.

* * * * *